United States Patent

Sassa et al.

[11] Patent Number: 5,792,229
[45] Date of Patent: Aug. 11, 1998

[54] FILTER AND FILTERING APPARATUS

[75] Inventors: Yukiya Sassa; Toshiaki Fukuta; Kenichi Kato, all of Nagoya; Hitoshi Ninomiya, Kariya, all of Japan

[73] Assignee: Nippondenso Co., Ltd., Kariya, Japan

[21] Appl. No.: 877,197

[22] Filed: Jun. 17, 1997

Related U.S. Application Data

[63] Continuation of Ser. No. 499,193, Jul. 7, 1995, abandoned.

[30] Foreign Application Priority Data

| Jul. 7, 1994 | [JP] | Japan | 6-180827 |
| Jul. 20, 1994 | [JP] | Japan | 6-191104 |
| Oct. 7, 1994 | [JP] | Japan | 6-270238 |

[51] Int. Cl.$^6$ ........................ B01D 46/52
[52] U.S. Cl. ........ 55/497; 55/502; 55/511; 55/521; 55/524
[58] Field of Search ............. 55/497, 499, 500, 55/502, 511, 521, 524, 385.3; 95/273

[56] References Cited

U.S. PATENT DOCUMENTS

| 2,968,361 | 1/1961 | Buckman | 55/502 |
| 3,138,443 | 6/1964 | Engle et al. | 55/499 |
| 3,243,943 | 4/1966 | Getzin | 55/500 |
| 3,246,457 | 4/1966 | De Baun | 55/499 |
| 3,397,518 | 8/1968 | Rogers | 55/502 |
| 3,692,184 | 9/1972 | Miller, Jr. et al. | 55/499 |
| 3,871,851 | 3/1975 | Neumann | 55/500 |
| 4,187,091 | 2/1980 | Durre et al. | 55/499 |
| 4,236,901 | 12/1980 | Kato et al. | 55/385.3 |
| 4,512,891 | 4/1985 | Wright et al. | 55/497 |
| 4,617,122 | 10/1986 | Kruse et al. | 55/521 |
| 4,976,677 | 12/1990 | Siversson | 55/521 |
| 5,071,555 | 12/1991 | Enbom | 55/500 |
| 5,167,740 | 12/1992 | Michaelis et al. | 55/521 |
| 5,501,794 | 3/1996 | Van de Graaf et al. | 55/521 |
| 5,512,075 | 4/1996 | Ninomiya et al. | 55/497 |

FOREIGN PATENT DOCUMENTS

| 2359729 | 6/1975 | Germany | 55/521 |
| 4323523 | 1/1995 | Germany | 55/502 |
| 61-74618 | 4/1980 | Japan . | |
| 61-74619 | 4/1980 | Japan . | |
| 63-82416 | 5/1988 | Japan . | |
| 1-65628 | 4/1989 | Japan . | |
| 1317519 | 12/1989 | Japan . | |
| 5103936 | 4/1993 | Japan . | |
| WO94/01200 | 1/1994 | WIPO | 55/497 |

*Primary Examiner*—Duane S. Smith
*Attorney, Agent, or Firm*—Cushman Darby & Cushman IP Group of Pillsbury Madison & Sutro LLP

[57] ABSTRACT

A filter corrugated in wave shape along a first axis has an end filter material piece positioning at an end of the first axis and adjacent filter material piece positioning adjoining to said end filter material piece. The end filter material piece and said adjacent end filter material piece are adhered to each other by an adhesive. In another embodiment, a filter element has a cushion material disposed between the end filter material piece and the adjacent end filter material piece. A filter material has convex and concave crease portions alternately disposed along a first axis thereof and extending along a second axis thereof. The convex and concave crease portions define alternating convex and concave spaces therein. An elastic material fills at least a portion of at least one of said concave and convex spaces.

16 Claims, 27 Drawing Sheets

FILTER AND FILTERING APPARATUS

This is a continuation of application Ser. No. 08/499,193, filed on Jul. 7, 1995, which was abandoned upon the filing hereof.

BACKGROUND OF THE INVENTION

1. Field of the Invention

The present invention relates to a filter element formed by corrugating a filter material, a filter using the filter element, a filtering apparatus using the filter, and assembling method of the filter, more particularly relates to the above filter element, filter, filtering apparatus, and assembling method applied to fluid filtration for air conditioners.

2. Description of the Related Art

A conventional filter is described in Japanese Utility Model Application Laid-Open No. Hei 1-65628. The filter is made of corrugated filter material. The filter material of the filter is fixed in a frame body to retain the wave-shape of the filter material with a hot-melt adhesive.

In Japanese Utility Model Application Laid-Open No. Sho 63-82416, a filter without using an adhesive is shown. A filter material is inserted into a frame body and a reinforcing rib supports the wave-shape of the filter element.

To retain a rigidity of the filter material, the frame body is provided. However, when the corrugated-shape filter material is combined with the frame body, an end piece of the material in a longitudinal direction of the filter material has an undesirable possibility to deform. In particular, in case the corrugated-shape filter material is designed to be replaceable, the filtered fluid may pass through the deformed end piece of the filter material without any filtration.

In Japanese Patent Application Laid-Open No. Sho 61-74619, a corrugated-shape filter material and a cushion material formed from a strip for achieving flexible fitting in a frame body by contracting are shown. An elasticity of the cushion material disposed along the both of longitudinal edges of the filter material can absorb an individual difference in dimension.

However, to prevent the cushion material from peeling off and being damaged, strong and expensive adhesives are required to make the cushion material adhere assuredly. Therefore, the production cost of the filter becomes high. Further since a lot of the cushion material is used along the corrugated longitudinal direction, the filter material has a repulsion force, so that a pushing plate or the like is required to fix the filter material in the frame body. Installation of the filter material to the frame body is not simple.

In Japanese Examined Patent Publication No. Sho 59-5006, for the purpose of replacing space saving, a flexible filter is proposed. Each of all parts of the flexible filter is made from an elastic material, so the whole filter is able to be bent with its own elasticity. Thereby, the filter is easy to be replaced even in a narrow space.

However, the filter material requires a lot of construction parts which results in a high production cost. Further an excessive deformation of the filter material makes it hard to insert and replace this type of the filter.

SUMMARY OF THE INVENTION

An object of the present invention is to provide a replaceable filter with a simple construction.

Another object of the present invention is to provide a filter having a reinforced end portion thereof with a simple construction.

Still another object of the present invention is to provide a filter enabling a filter material to be easily fixed to a rigid frame body.

A further object of the present invention is to provide a filter enabling it to be inserted and replaced easily by preventing excessive deformation of the filter.

To achieve the above objects, one preferred mode of the present invention adopts a filter including a filter material corrugated in wave plate shape along a first axis thereof, the filter material has an end filter material piece positioning at an end of the first axis and adjacent filter material piece positioning adjoining to the end filter material piece, the end filter material piece and the adjacent end filter material piece are adhered to each other.

Consequently, the end portion of the filter material has a proper rigidity. Even when a pressing force is applied to the filter material in the first or second axis direction, the end portion of the filter material does not become deformed.

In another preferred mode of the present invention, the filter material has convex and concave crease portions alternately disposed along a first axis thereof and extending along a second axis thereof, the convex and concave crease portions are formed from the adjacent filter material pieces, and between the adjacent end filter material pieces, a cushion material is disposed.

As a result, the cushion material does not contact an inner wall of the frame body directly. Therefore, peeling off and damage is not caused on the cushion material, so that filter replacement work becomes easier.

In still another preferred mode of the present invention, an elastic material is disposed proximate to one of the convex and concave crease portions at a peripheral portion of the filter material extending along the first axis, and the elastic material fills a peripheral portion of at least one of the concave and convex crease portions.

Consequently, the filter has some degree of flexibility that is required in filter replacement working and enables it to retain its outline.

DETAILED DESCRIPTION OF THE PREFERRED EMBODIMENTS

Figure 1:
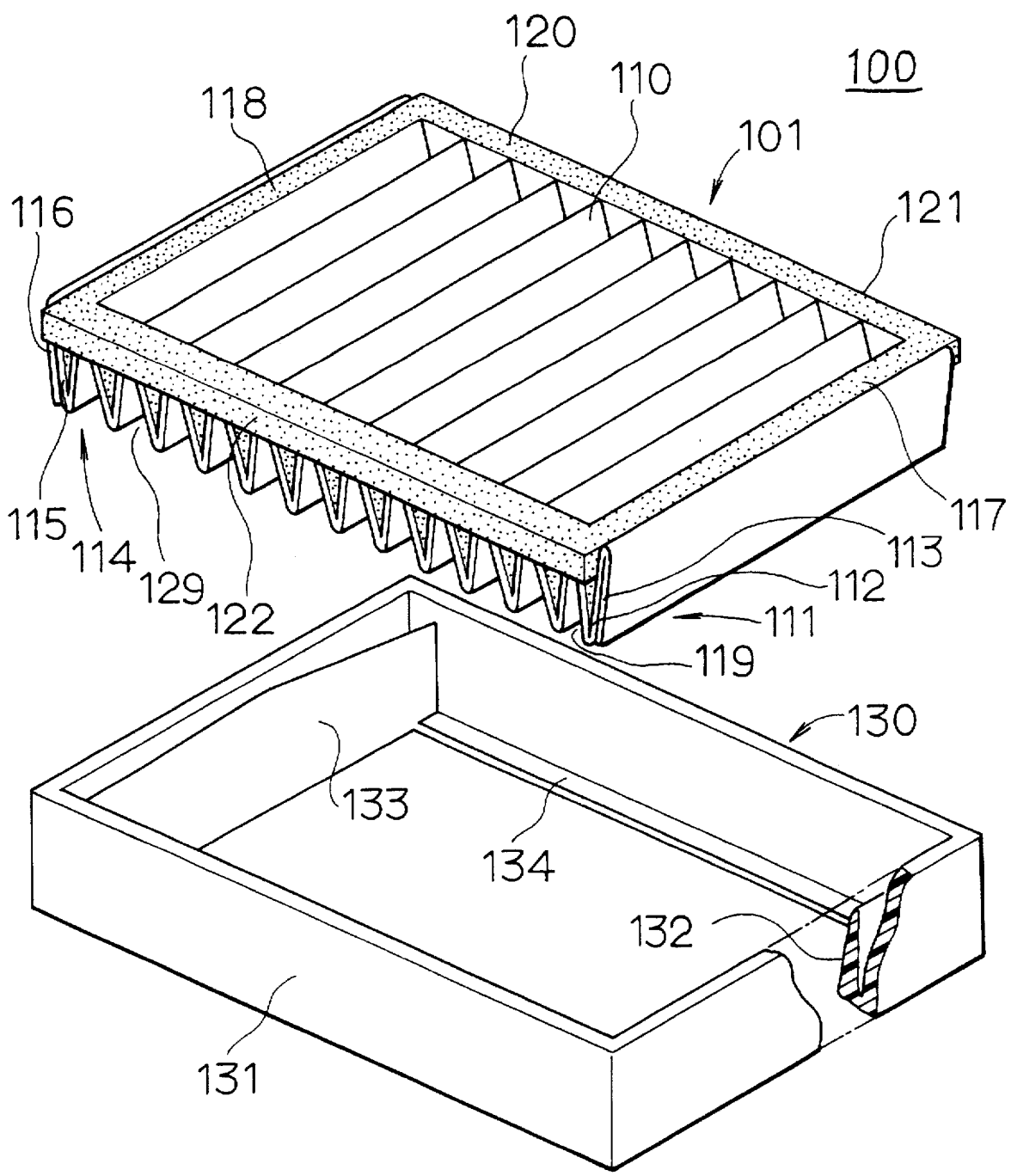
FIG. 1 is an exploded view illustrating a filter of a first embodiment.

The present invention will be described in detail with reference to the accompanying drawings.

In a first embodiment (FIG. 1), a filter 100 has an replaceable element 101 and a frame 130. The element 101 has an air permeability filter material 110 folded in a zigzag shape and an elastic foaming resin 120 formed around an upstream surface thereof. The filter paper in zigzag shape has a plurality of concave and convex crease portions. At both end portions 111 and 114 of the filter material 110 in the longitudinal direction, adjacent filter paper pieces 112 and 113 and filter paper pieces 115 and 116 are adhered with a hot-melt type adhesive. Thus, both end portions of the filter material 110 are reinforced by adhered two filter material pieces. The foaming resin 120 provides the element 101 strength so as not to be bent easily and not to be contracted in the zigzag direction and further provides flexibility so that it can be installed to the frame 130 easily. The foaming resin 120 is installed so as to encircle an outer circumference of the filter material 110. In particular, the foaming resin 120 has a belt shape at both sides of the element 101 it and covers and plugs both sides of all concave crease portions. Further, the foaming resin 120 fills up the entire concave crease portions at both ends of their longitudinal direction. The foaming resin 120 projects from the filter material 110 at both side portions 121 and 122.

The frame 130 is formed by a hard resin and includes a frame body 131 surrounding all four directions and both ends thereof. Further, the frame 130 has ribs 132 and 133 protruding parallel to the frame body 131 at the longitudinal ends and inserted into convex crease portions 119 and 129 of the filter material 110 at the both ends in the longitudinal direction. The ribs 132 and 133 have most project portions at the centers thereof, respectively. As shown in FIG. 1, a cross-section of the rib 132 has a triangle section corresponding to the shape of the concave crease portion of the filter material 110. Moreover, at the bottom edge of the frame 130, a guard portion 134 is installed at the outer circumference of the lateral frame body 131 to stop the element from dropping.

The element 101 is inserted from the upstream side of the frame 130. At that time, the ribs 132 and 133 are inserted into convex crease portions 119 and 129 at both longitudinal ends of the element 101. In the process of the insertion, a concave crease portion 117 filled with the foaming resin 120 is inserted between the rib 132 and the frame 130 by accompanying compressive deformation of the foaming resin 120. A concave crease portion 118 also filled with the foaming resin 120 is inserted between the rib 133 and the frame body 131 by compressive deformation of the foaming resin 120. However, both side resin portions 121 and 122 extending at both longitudinal sides of the filter material 110 is pressed into the frame 130 by compressive deformation. Thus, the element 101 is disposed inside of the frame 130 without air leakage from the outer circumference. Further, since the element 101 is installed with some tension on both sides thereof, the element 101 is assuredly fixed without any slip inside of the frame body 130. The filter 100 is disposed, for example, at a ventilation passage of an automotive air-conditioner. According to this embodiment, both ends of the element 101 are reinforced by adhering the adjacent filter material 110. Therefore, deformation of the element 101 can be prevented with a simple construction.

Since the element 101 has at least the side resin portions 121 and 122 extending in a belt shape along both longitudinal sides thereof, the foaming resin 120 obtains rigidity so as not to be deformed in the zigzag direction with a weak force. Therefore, deformation of the element 101 can be prevented with the simple construction. Further, the lateral ends of the concave crease portions can be plugged with the foaming resin 120 and air not passing through the filter material 110 can be obstructed.

The element 101 is fixed by the ribs 132 and 133 at both longitudinal ends of the frame 130. Moreover, by compressing and deforming the concave crease portion at both longitudinal ends, the element 101 is installed with some tension. Therefore, the element 101 can be assuredly installed with a simple installation operation.

A second embodiment is explained with reference to FIGS. 2 through 6.

Figure 2:
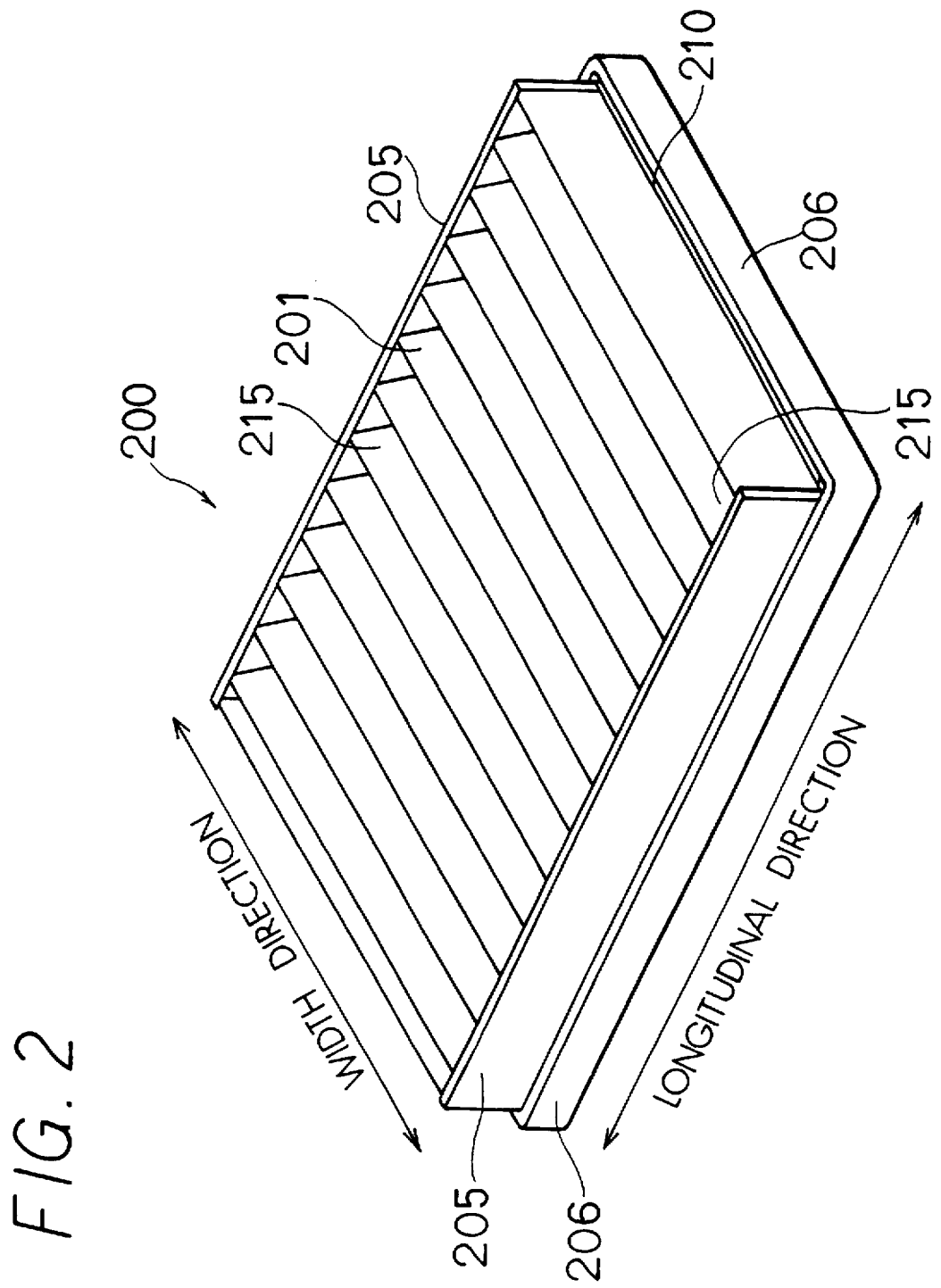
FIG. 2 is a perspective view illustrating the filter of a second embodiment.
Figure 3:
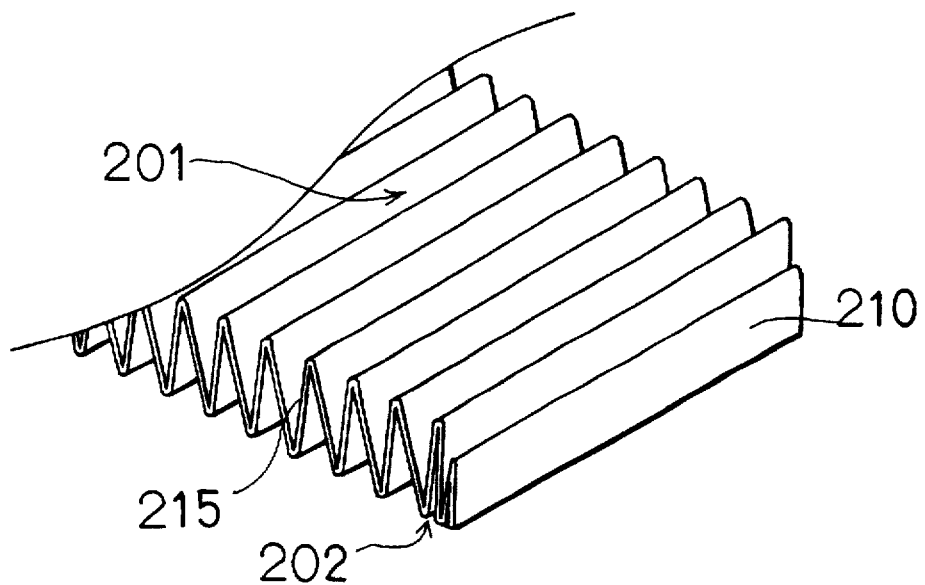
FIG. 3 is a perspective view illustrating the filter material of the second embodiment.
Figure 4:
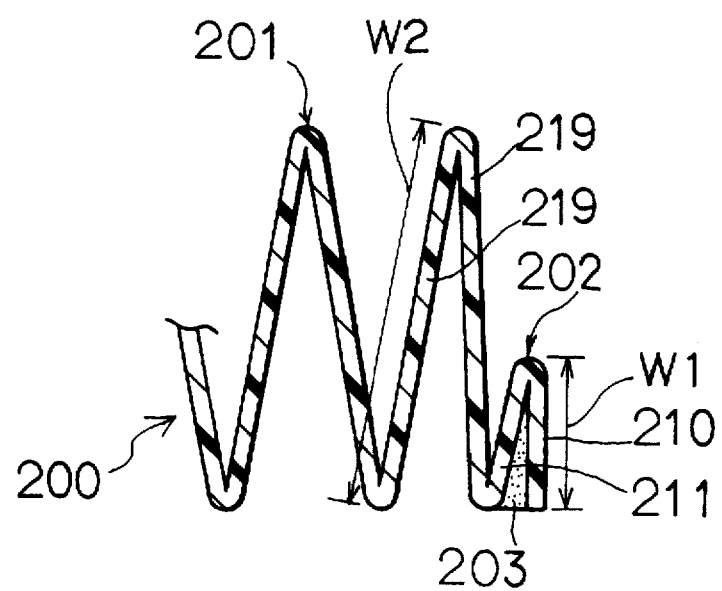
FIG. 4 is a cross-sectional view illustrating the filter of the second embodiment.

As shown in FIGS. 2 and 3, a filter material 201 is folded and corrugated in a form of a wave plate shape in a longitudinal direction. As shown in FIG. 4, an end filter material piece 210 positioning at an end portion 202 in the longitudinal direction of the filter material 201 and an adjacent filter material piece 211 adjoining to the end filter material piece 210 are adhered by a hot-melt adhesive 203 lying therebetween with a thickness of several millimeters.

The end filter material pieces 210 are positioned at both end portions in the longitudinal direction of a filter 200. A wave-shaped filter material piece 219 is positioned between both end filter material pieces 210.

A folding width W1 between the end filter material piece 210 and the adjacent filter material piece 211 is, for example, about 1 cm. A folding width W2 of the other wave-shaped filter material piece 219 is, for example about 2 cm. From the production cost, it is advantageous to design W1 to be about half of W2.

As shown in FIG. 2, side end plates 205 are disposed along the longitudinal direction at both side end portions 215 in a width direction of the filter material 201.

A seal material 206 is made of an elastic foaming body and is installed around a whole circumference of the filter 200.

Next, a manufacturing method of the filter 200 is explained.

A plane-shaped filter material wound in a roll shape is folded and corrugated in a form of a wave plate shape. The corrugated filter material is cut off with every necessary numbers of concave crease portions so that the last filter material piece ends with a concave crease portion. As shown in FIG. 4, the last filter material pieces at both ends in the longitudinal direction of the filter material 201 are folded in half. The tip end piece of the half folded filter material is the end filter material piece 210. A filter material piece adjoining to the end filter material piece 210 is an adjacent filter material piece 211. Between the end filter material piece 210 and the adjacent filter material piece 211, the hot-melt adhesive 203 is filled in.

As shown in FIG. 2, the hot-melt adhesive 203 is filled at both side end portions 215 in the width direction of the filter material 201 and is formed into a plate shape so that the end plate 205 is formed. Thus, the filter 200, only constructed by a filter material 201 and adhesive, is obtained. The side end plate 205 can be formed by, for example, adhering the filter material 201 with another plate-shaped member. Then, seal member 206 of sponge and the like is installed at the outer circumference of the filter 200.

Figure 5:
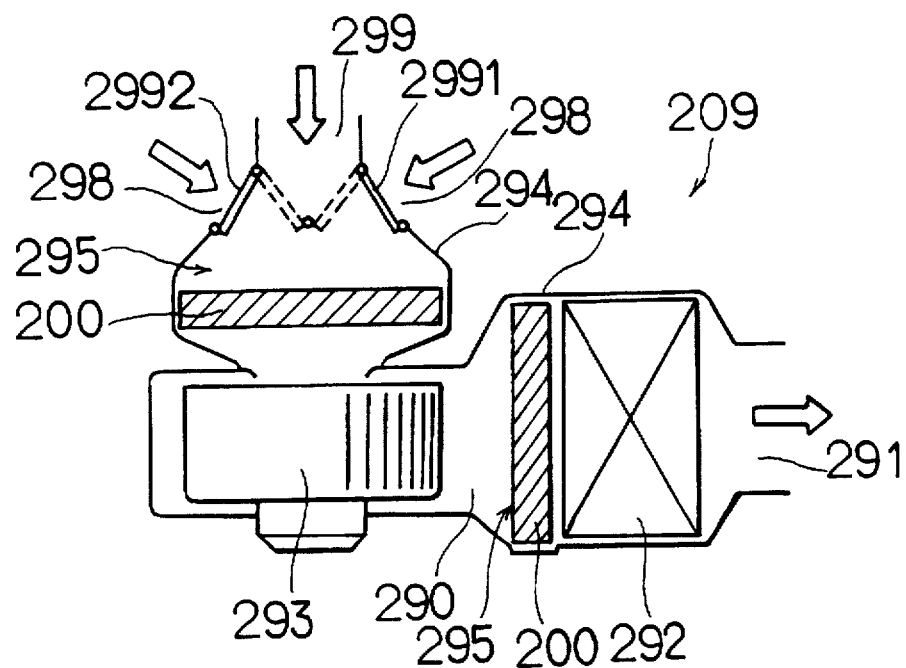
FIG. 5 is an explanatory view illustrating an air-conditioner of the second embodiment.

As shown in FIG. 5, the filter 200 is disposed as a filter device 295 installed in an automotive air-conditioner 209. The air-conditioner 209 has a case 294 through which air passes as a filtered fluid, a blower 293 and a heat exchanger 292 installed therein and the filter device 295. The filter devices 295 is also installed over the blower 293 and between the blower 293 and the heat exchanger 292. At least only one filter device 295 is required.

The air-conditioner 209 has an outside air introduction port 299 and an inside air introduction port 298 for introducing filtered air and an outlet port 291 of the filtered air. Air is introduced from the outside air introduction port 299 or the inside air introduction port 298 by opening and closing switching doors 2991 and 2992 for selecting an inside air or an outside air and is introduced into a fluid passage 290 of the case 294. Temperature of the filtered air is adjusted by the heat exchanger 292. At that time, the air is filtered at the filter device 295 disposed upstream of the blower 293 and also is filtered at the other filter device 295 disposed upstream of the heat exchanger 292.

Figure 6:
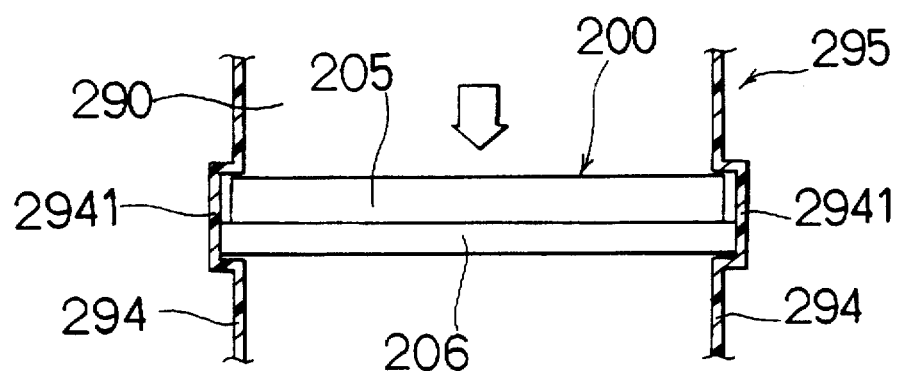
FIG. 6 is a cross-sectional explanatory view illustrating the filter device of the second embodiment.

As shown in FIG. 6, the filter device 295 includes the case 294 passing filtered air and the filter 200 installed therein. The filter 200 is engaged with an engagement portion 2941 formed in a groove shape at a wall surface portion of the case 294 through the seal material 206 at a bottom of the filter 200. The filter 200 can be replaceable from a window formed in a part of the engagement portion 2941.

Next, an operation of the embodiment is explained.

As shown in FIG. 4, the end filter material piece 210 in the longitudinal direction of the filter material 201 and the adjacent filter material piece 211 are adhered each other. Therefore, the end portion 202 of the filter material 201 can have proper rigidity. Thus, even though a pressing force is applied to the filter material 201 from the longitudinal direction or the width direction, the end portion 202 of the filter material 201 is not deformed.

As shown in FIG. 2, the side end plates 205 are installed along the longitudinal direction of both side end portions 215. Thus, rigidity in the longitudinal direction of the filter material 201 can be obtained.

At the end portion of the filter material 201, rigidity is obtained by adhering adjoining two pieces of filter material pieces with adhesive. Thus, by the rigidity of the end portion 202 and the rigidity of the side end plates 205, even though there is no side end plate in the width direction of the filter 200, rigidity of the whole filter 200 can be obtained.

Further, in this embodiment, since the end filter material piece and the adjacent filter material piece are formed by folding the last filter material piece of one filter material folded with the same pitch, a manufacturing process is simple and avoids waste of the filter material.

In order to reduce a production cost, the folded width W1 of the last filter material piece is preferably half of the folded width W2 of the other filter material piece 219.

As shown in FIG. 6, in the filter device 295 of the embodiment, the filter 200 is installed in the case 294 directly just through the seal material 206. The end portion 202 of the filter 200 has rigidity as described above. Thus, the filter 200 can be installed into the case 294 without any reinforcing members like special frames. Further, the filter 200 is installed in the case 294 through the seal material 206. Therefore, necessary seal ability and vibration resistance can be obtained.

A third embodiment is explained.

Figure 7:
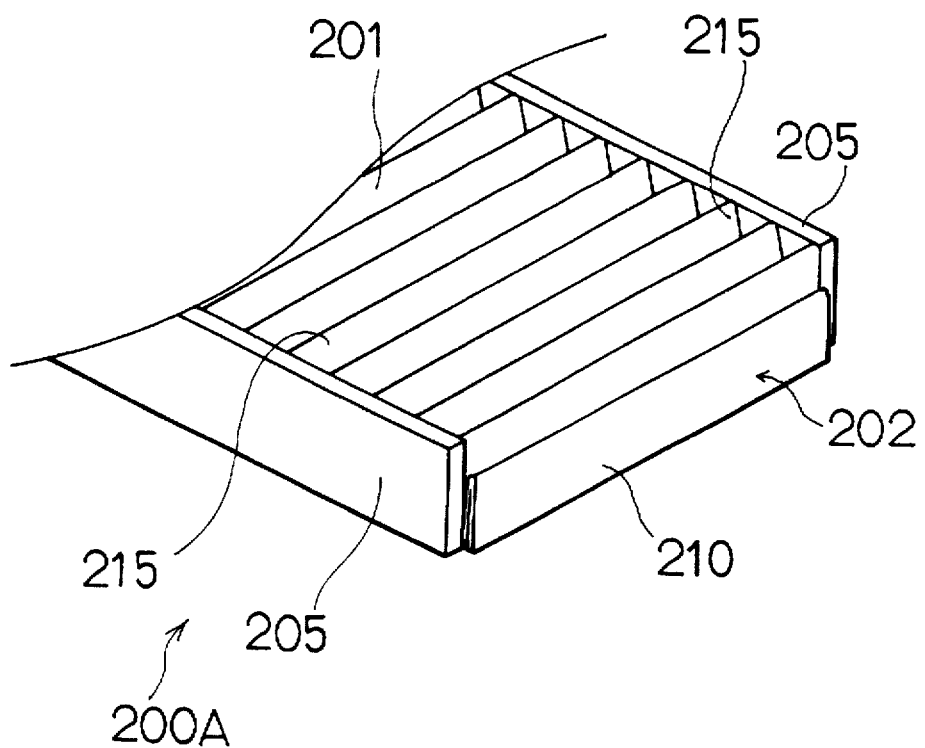
FIG. 7 is a perspective view illustrating the filter of a third embodiment.
Figure 8:
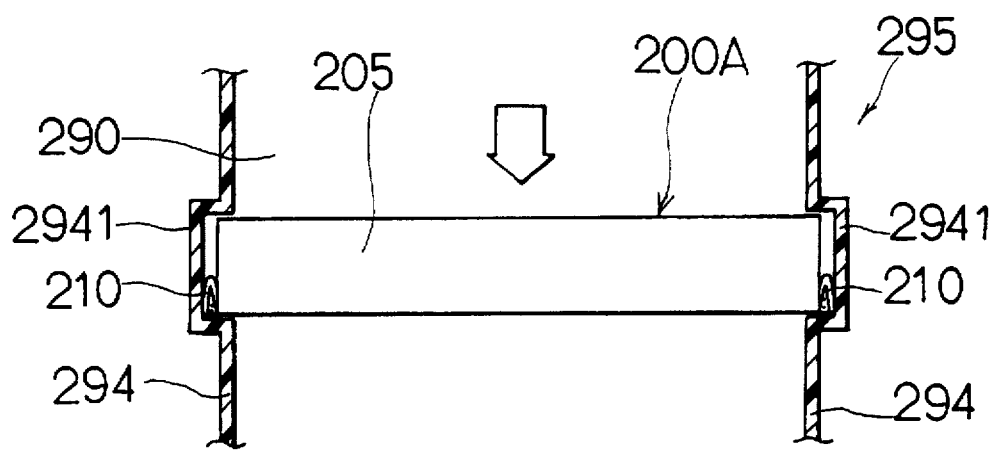
FIG. 8 is an explanatory view illustrating the filter device of the third embodiment.
Figure 9:
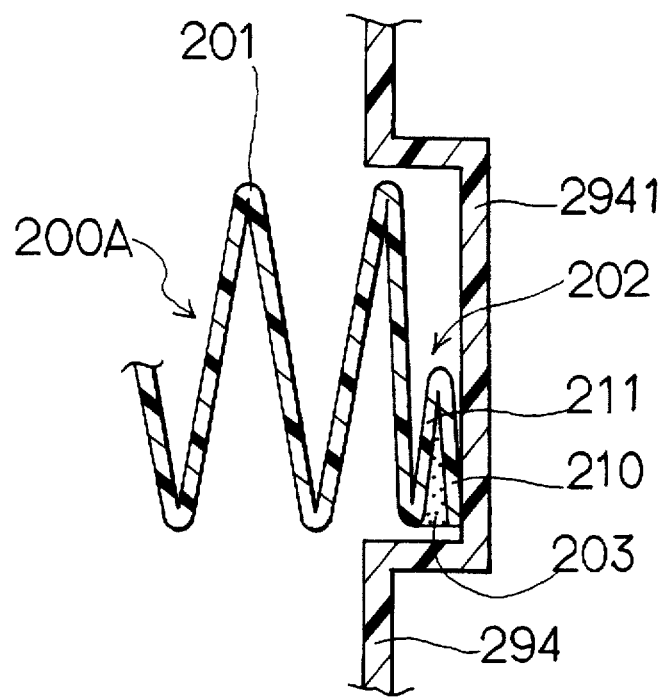
FIG. 9 is an explanatory view illustrating an assembling method of the filter of the third embodiment.

As shown in FIGS. 7 through 9, a filter 200A is a filter in the second embodiment and is installed directly at the case 294 of the filter device 295 without using the seal material.

As shown in FIG. 7, the filter 200A has the side end plate 205 at both side end portions 215 of the filter material 201. As shown in FIGS. 8 and 9, the end portion in the longitudinal direction of the filter material 201 directly contacts the engagement portion 2941 of the case 294 and is engaged thereto.

The other members of the filter are the same as the second embodiment. Therefore, explanation about them is omitted.

In the embodiment, the filter 200A obtains enough rigidity by joining the end filter material piece 210 at both end portions 202 of the filter material and the adjacent filter material piece and the side end plates at both side ends of the filter material 201. Therefore, maintaining a whole shape of the filter material 201, the filter 200A can be installed at the case 294.

In this embodiment, the same effects as the second embodiment can be obtained.

A fourth embodiment is explained.

Figure 10:
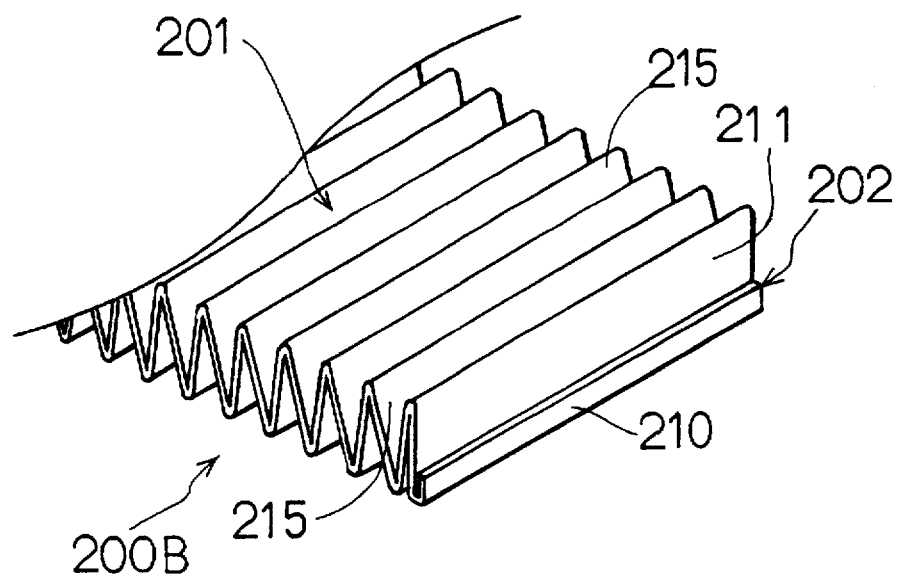
FIG. 10 is a perspective view illustrating the filter of a fourth embodiment.
Figure 11:
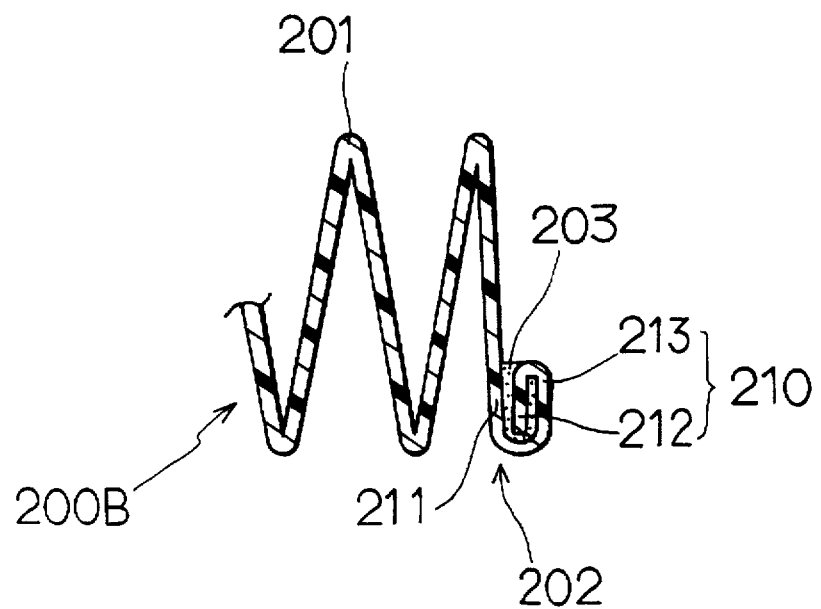
FIG. 11 is a cross-sectional view illustrating the filter of the fourth embodiment.
Figure 12:
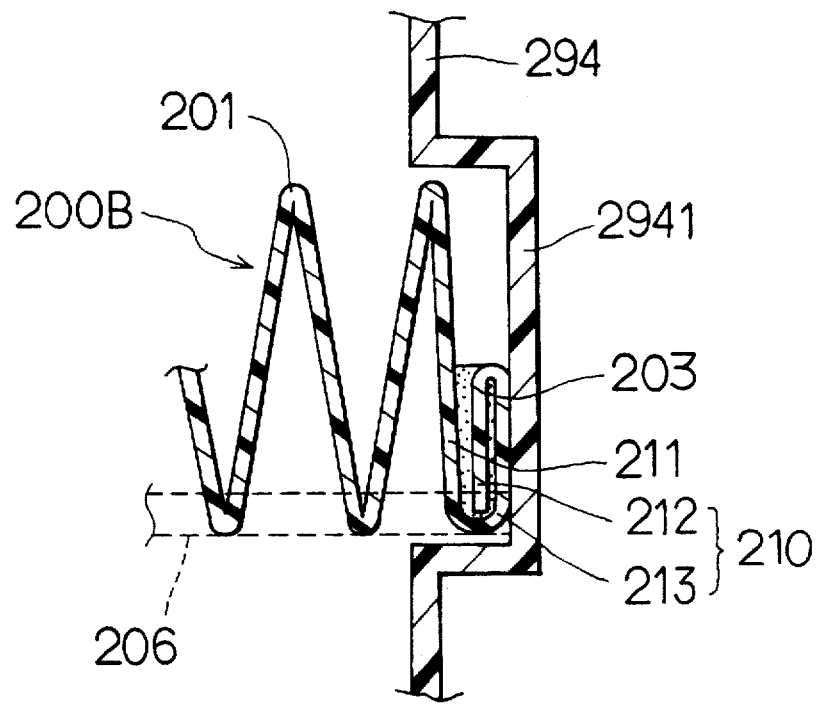
FIG. 12 is an explanatory view illustrating the assembling method of the filter of the fourth embodiment.

As shown in FIGS. 10 through 12, the end filter material pieces 210 positioning at both end portions 202 in the longitudinal direction of the filter material 201 of the filter 200B is folded in the middle and the tip portion of the end material piece 210 is held inside thereof.

That is, as shown in FIG. 11, the end filter material piece 210 includes a first piece 212 folded back inside and a second piece 213 positioning outside of the first piece 212. The folded first piece 212 is facing with the second piece 213 and the adjacent filter material piece 211, respectively. The first piece 212, the second piece 213 and the adjacent filter material piece 211 are adhered to each other through the hot-melt adhesive 203.

At the side end portion 215 of the filter material 201, the side end plate is installed just like the second embodiment (omitted in the figure).

The other members of the filter are the same as the second embodiment.

As shown in FIG. 12, the end filter material piece 210 of the filter material 201 is folded back inside and the hot-melt adhesive 203 is filled between each filter material piece. Thus, the filter 200B has higher rigidity of the end portion than that in the second embodiment. Therefore, likewise as the filter 200A in the third embodiment, the filter 200B can be installed directly at the case 294 of the filter device 295 without using the seal material. However, when higher seal ability is required, as shown in a dotted line in FIG. 12, the filter 200B can be installed at the case 294 of the filter device 295 through the seal material 206. The same effects as the second embodiment can be obtained.

A fifth embodiment is explained.

Figure 13:
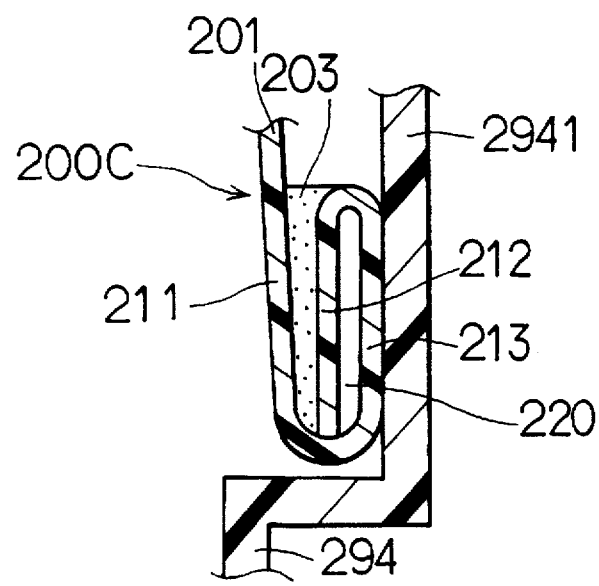
FIG. 13 is an explanatory view illustrating an assembling method of the filter of a fifth embodiment.

As shown in FIG. 13, in a filter 200C, adhesive is not filled in a center portion 220 formed between the first piece 212 and the second piece 213. That feature is different from the fourth embodiment described above.

That is, between the first piece 212 and the adjacent filter material 211, the adhesive 203 is filled in. The other parts are the same as in the fourth embodiment.

In the filter 200C, since adhesive is not filled in a center portion 220, the center portion 220 without filling the adhesive generates elasticity. Therefore, by the elasticity, the seal ability is improved and the filter 200C can be directly installed in the case 294 of the filter device 295.

In the embodiment, the same effects of the fourth embodiment can be obtained.

A sixth embodiment is explained.

Figure 14:
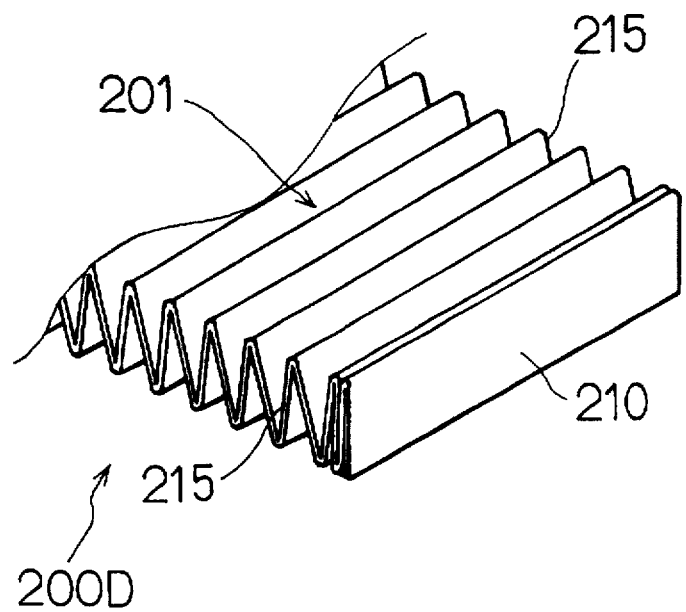
FIG. 14 is a perspective view illustrating the filter of a sixth embodiment.
Figure 15:
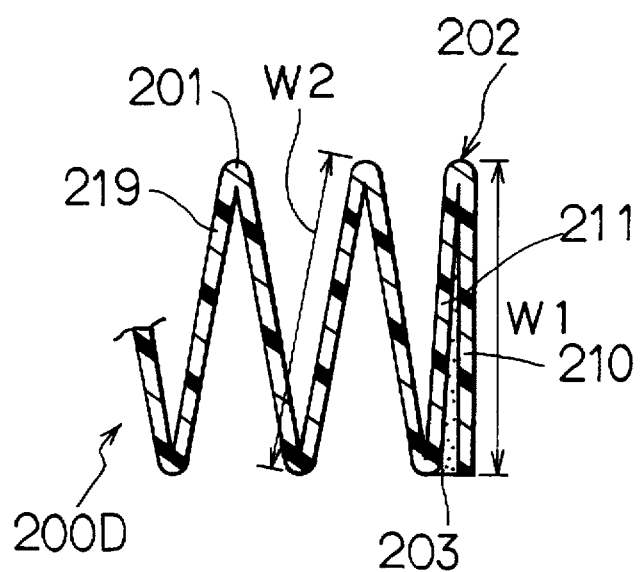
FIG. 15 is a cross-sectional view illustrating the filter of the sixth embodiment.

In each filter 200D of this embodiment, as shown in FIGS. 14 and 15, each folded width of the wave-shaped filter material 201 is in the same extent. That is, the folded width W1 of the end filter material 210 and adjacent filter material 211 is the same as the extent of the folded width W2 of the wave-shaped filter material piece 219.

The filter 200D is installed directly to the filter device without using the seal material. The other parts are the same as in the third embodiment.

In the filter 200D, since the folded width W1 of the end filter material piece 210 positioned at the end portion 202 and the adjacent filter material 211 is the same length as the folded width W2 of the filter material piece 219, higher rigidity and higher sealing effects can be obtained.

In the embodiment, the same effects of the third embodiment can be obtained.

A seventh embodiment is explained.

Figure 16:
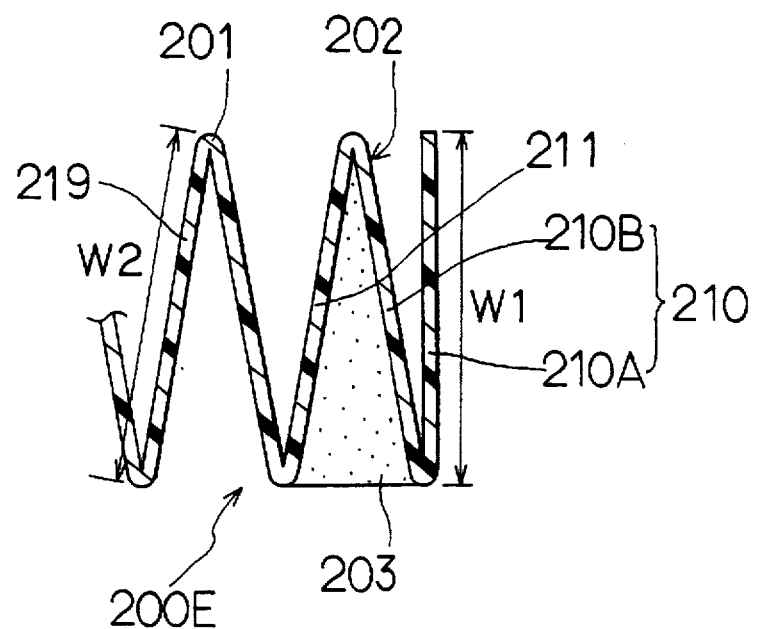
FIG. 16 is a cross-sectional view illustrating the filter of a seventh embodiment.

As shown in FIG. 16, a filter 200E has the end filter material piece 210 having a first filter material piece 210A and a second filter material piece 210B. The first filter material piece 210A is the last filter material piece in the longitudinal-direction of the filter material and the second filter material 210B is the filter material piece adjoining the first filter material piece 210A. Both filter material pieces 210A and 210B form a concave crease portion.

Between the second filter material piece 210B and the adjacent filter material piece 211, the hot-melt adhesive 203 is filled. Between the second and the first filter material pieces 210A and 210B, the hot-melt adhesive 203 is not filled. The folded width W1 of the first filter material piece 210A, the second material piece 210B and the adjacent filter material piece 211 is the same length as the folded width W2 of the other filter material piece 219.

The other parts are the same as in the second embodiment.

In the embodiment, the same effects as the second embodiment can be obtained.

A eighth embodiment is explained.

Figure 17:
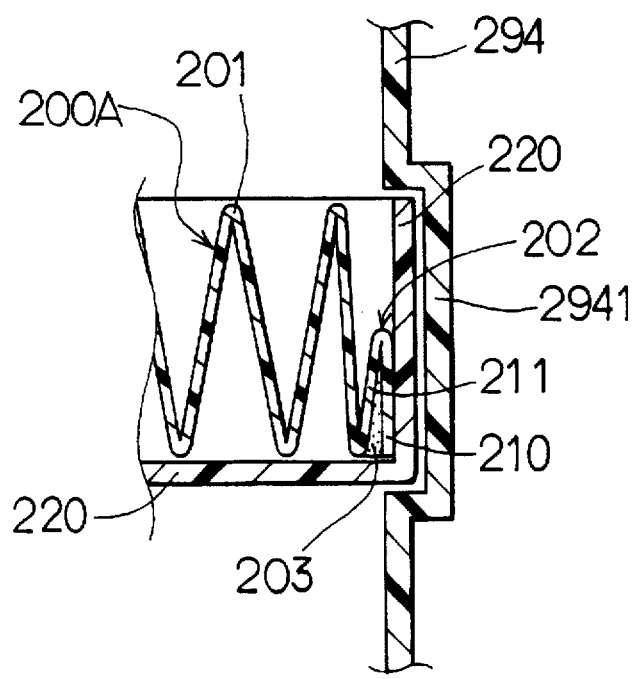
FIG. 17 is an explanatory view illustrating the filter assembled in a frame body of an eighth embodiment.

As shown in FIG. 17, the filter 200A in the embodiment is installed inside of a frame body 220 having the same dimension as the outer shape of the filter 200A. The frame body 220 is engaged with the engagement portion 2941 formed in a groove shape at a wall surface of the case 294 of the filter device. The other parts are the same as in the second embodiment.

In the embodiment, since rigidity of a whole filter 200A is high, the frame body 220 can be installed by maintaining the whole shape of the filter 200A. Further, the end portion 202 in the longitudinal direction of the filter material 201 is not deformed. The same effect of the second embodiment can be obtained.

The filter element, the filter using the filter element and assembling method of the filter in a ninth embodiment are explained with FIGS. 18 through 25. The filter in the present invention is an air filter for an air-conditioner as described later.

Figure 18:
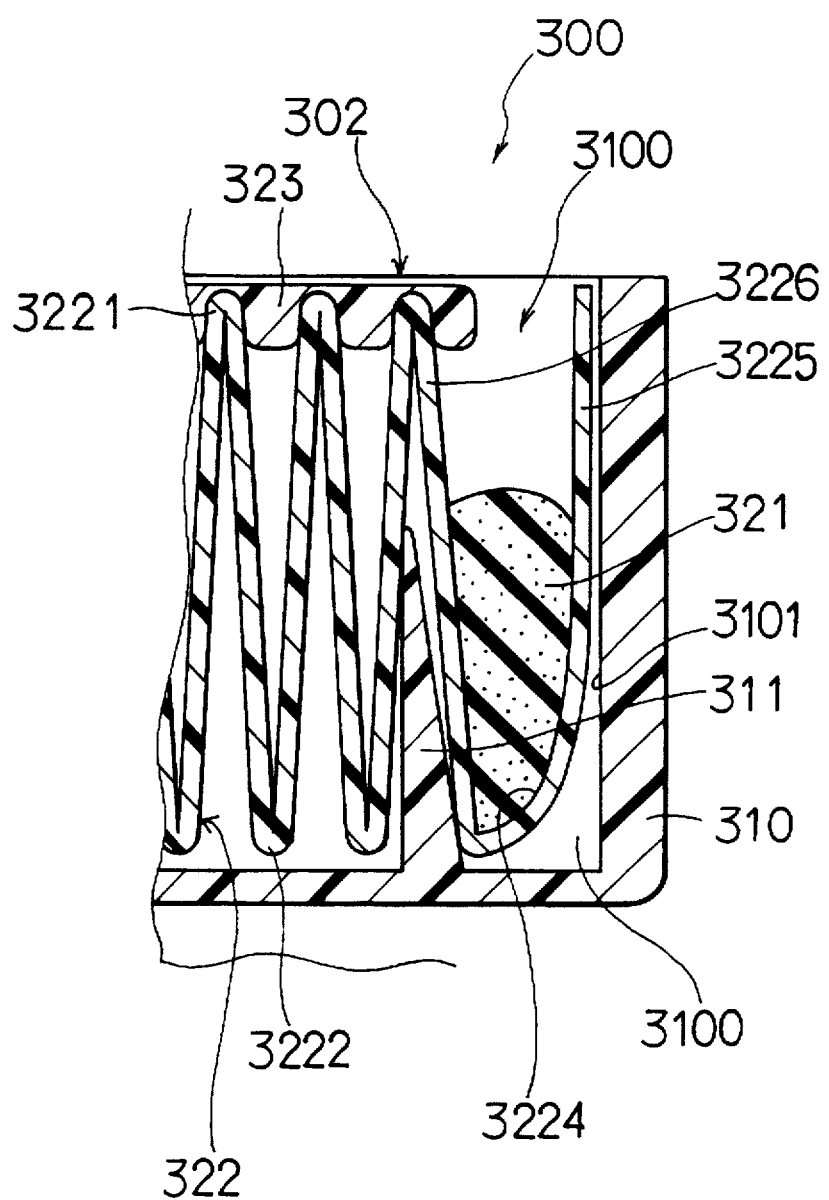
FIG. 18 is a cross-sectional view illustrating an end portion of the filter of a ninth embodiment.
Figure 19A:
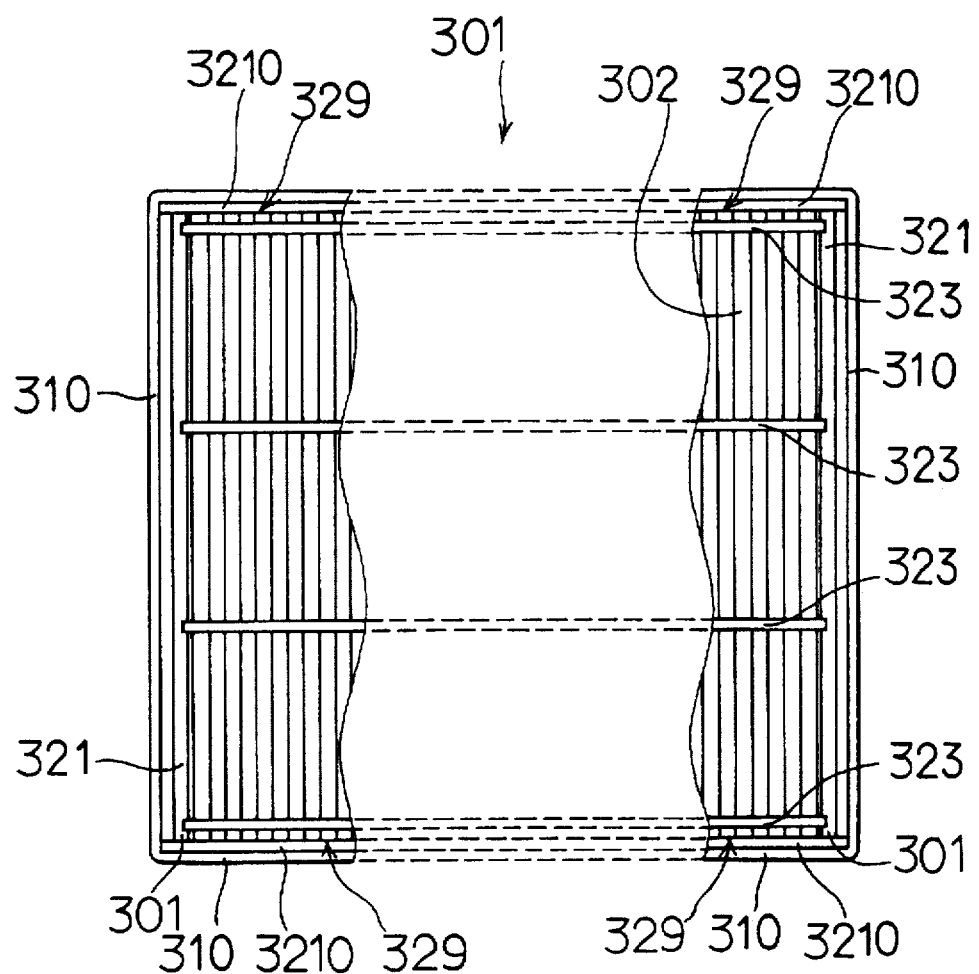
FIG. 19A is a front view illustrating the filter of the ninth embodiment.
Figure 19B:
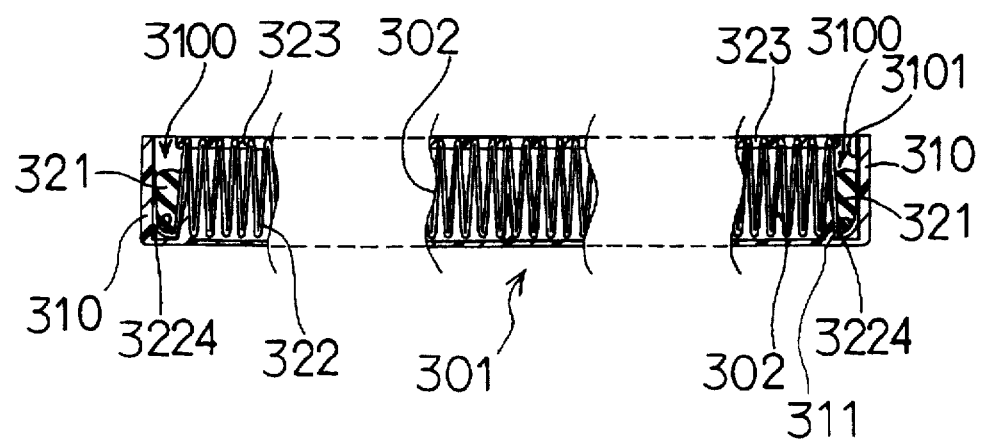
FIG. 19B is a cross-sectional view illustrating the filter of the ninth embodiment.

As shown in FIGS. 18, 19A and 19B, the filter 300 in the embodiment includes a filter element 302 having corrugated filter material 322 and an end filter material 3225, and the frame body 310 accommodating the filter material element 302. The filter element 302 has a cushion material 321 between the end filter material 3225 and adjacent filter material 3226. The frame body 310 has a holding space 3100 formed between a support member 311 and the frame body 310 and holding the end filter material 3225, adjacent filter material 3226 and the cushion material 321. The holding space 3100 has narrower width than the cushion material 321. Further, the filter element 302 is a wave-shaped body of the filter material 322 which is corrugated in a wave-shape and an end of the wave-shaped body is the end filter material 3225.

Next, the filter element 302 has a plurality of convex crease portions 3221 and a plurality of concave crease portions 3222 installed alternately. A folded concave portion 3224 is set between the end filter material 3225 and the adjacent filter material 3226 adjoining thereto. Inside the folded concave portion 3224, the cushion material 321 is installed on the adjacent filter material 3225 through adhesive. Even though the cushion material 321 is installed on the adjacent filter material 3226 through adhesive, the same effects can be obtained. As shown in FIG. 19A, at the filter element 302, for example, four retainers 323 for retaining the wave shape of the filter material 3226 are installed. A break of shape of the filter material is prevented by the retainers. The retainers are made from heat fusion resin. Further, at a side surface 329 of the filter element, a side portion cushion material 3210 different from the end cushion material 321 is attached. The cushion material 3210 is made of polyurethane foam or the like. For the cushion material, a rubber, rubber foaming body or the like can be used.

Figure 20:
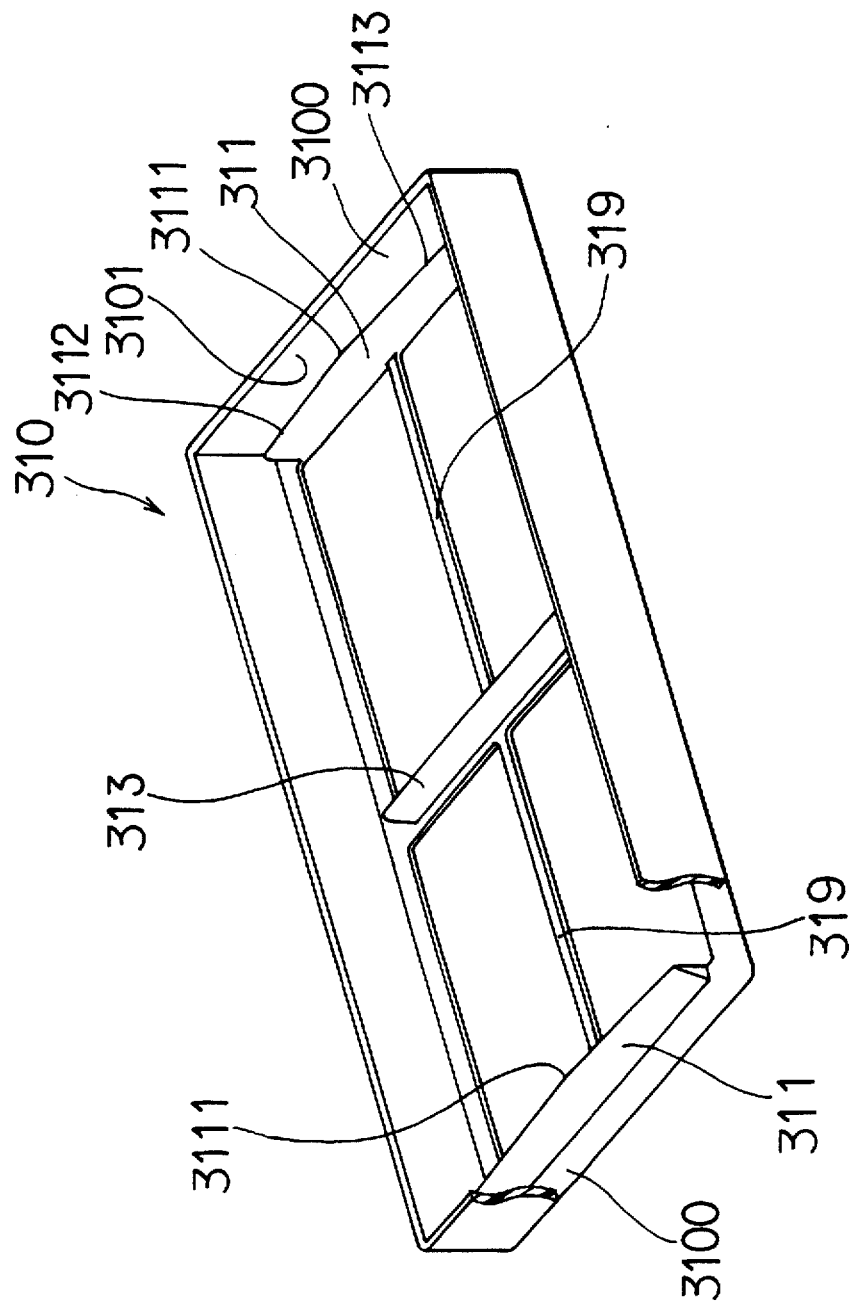
FIG. 20 is a perspective view illustrating the frame body of the ninth embodiment.

As shown in FIGS. 18 through 20, the holding space 3100 of the frame body 310 is formed by an inner wall 3101 of the frame body 310 and a support member 311. The support member 311 is a wedge-shaped projection installed in parallel to the inner wall 3101. The support member 311 has a center portion 3111 which is the highest and both end portions 3112 and 3113 which are the lowest of all (see FIG. 20).

Further, at a bottom surface of the frame body 310, the frame body 310 has a reinforcing rib 319 to reinforce the frame body 310 and to prevent the filter element 302 from dropping.

Figure 21:
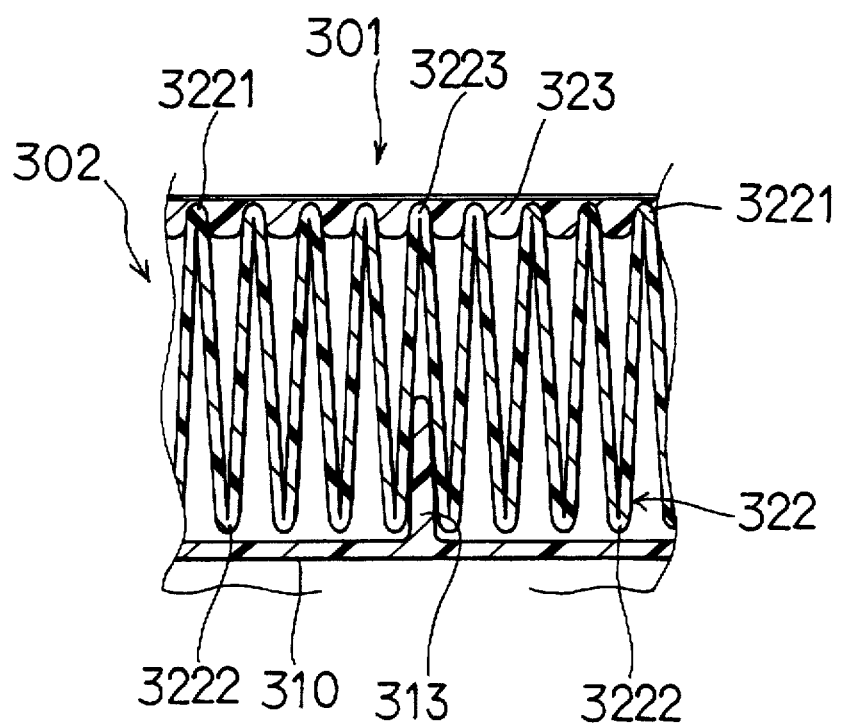
FIG. 21 is a partial cross-sectional view illustrating the filter of the ninth embodiment.
Figure 22:
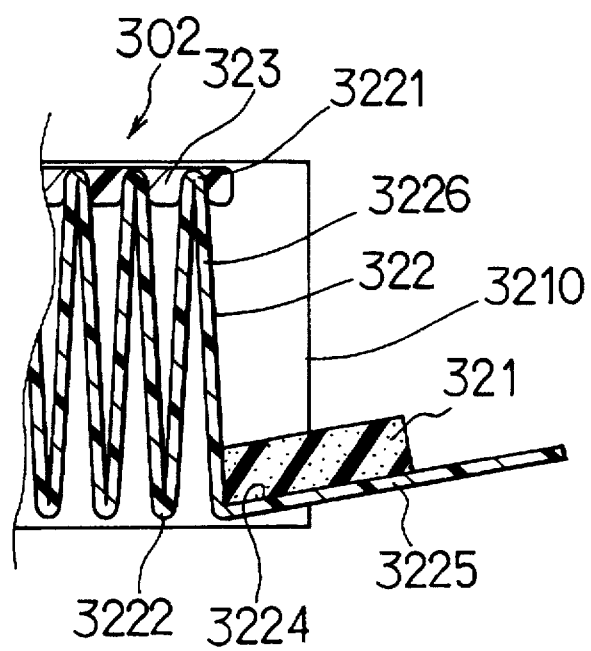
FIG. 22 is a cross-sectional view illustrating an end portion of a filter element of the ninth embodiment.

As shown in FIGS. 20 and 21, around the center of the frame body 310, an insert piece 313 having the same wedge-shaped projection as the support member 311 is installed. The insert piece 313 is inserted into the convex crease portion 3223 of the filter element 302 from the bottom of the further element 302. In FIG. 22, the cushion material 321 is disposed on the end filter material piece 3225. The cushion material 321 may be adhered to only a side of the end filter material piece 3225 by an adhesive such as acrylic type resin or rubber type resin, etc. Instead of using an adhesive, a cushion material with joining material such as an adhesive tape, etc. may be used. By using joining material, a cushion material may be joined to the end filter material piece or the adjacent filter material piece. In this case, applying work for adhesive is omitted, so that fabrication of the filter element becomes easier. Further as for a cushion material, urethane foam with adhesive or foaming rubber sheet with adhesive on the market are also used. These are cheap and the production cost will be reduced.

Next, assembling to and taking the filter element 302 into and out of the frame body 310 is explained.

Figure 23:
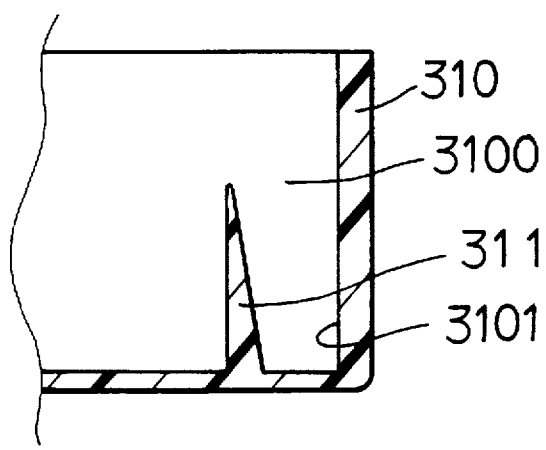
FIG. 23 is a partial cross-sectional view illustrating the frame body of the ninth embodiment.

As shown in FIGS. 22 and 23, a folded concave portion 3224 is installed between the end filter material 3225 of the filter material 322 and the adjacent filter material 3226. The filter element 302 (in FIG. 22) having the cushion material 321 on the folded portion 3224 and the frame body 310 (in FIGS. 20 and 23) are prepared.

As shown in FIG. 18, the folded concave portion 3224 of the filter element 302 is inserted toward the holding space 3100 from the tip end thereof and the end filter material 3225 contacts the inner wall 3101 inside the frame body 310. By using elasticity of the cushion material 321 and pressing the end filter material 3225 to the side of the adjacent filter material 3226,the filter element 302 is assembled to the holding space 3100 inside of the frame body 310.

Further, when the filter element 302 is removed from the frame body 310, the filter element 302 is taken out from one side of both end portions 3112 and 3113 of the support member 311.

An operational effect in the present invention is explained.

In the filter element 302 of the present invention, the folded portion 3224 is provided between the end filter material 3225 and the adjacent filter material 3226. The cushion material 321 is installed at the folded portion 3224.

Therefore, when the filter 300 is formed by holding the filter element 302 in the frame body 310, the cushion material 321 does not contact the inner wall 3101 of the frame body 310 directly. Thus, the cushion material 321 is not removed and damaged. Hence, when the filter element 302 is replaced, since the cushion material 321 is not removed and damaged, the exchange operation is carried out smoothly and easily.

Further, since the cushion material 321 is not removed from the filter element 302, to adhere the cushion material 321, a strong and cheap adhesive can be used. Therefore, manufacture cost of the filter element 302 is reduced.

Therefore, according to the present invention, the cushion material is not removed from the filter element and damaged. The filter element is supported easily and the filter element and the filter have cheap manufacturing and assembly costs.

In the filter element 302 of the present invention, in order to prevent deformation of the filter element by pressure of passing air therethrough, the adhesive 323 is provided. In the frame body 310, the insert piece 313 is provided. Therefore, even though the filter element 302 is assembled in a wrong way and is assembled to the front and back surface upside-down against the frame body 310, the adhesive 323 and the insert piece 313 interfere and the filter element 302 cannot be assembled. Thus, wrong assembly of the filter element to the frame body 310 can be prevented.

A tenth embodiment is explained with reference to FIG. 24.

Figure 24:
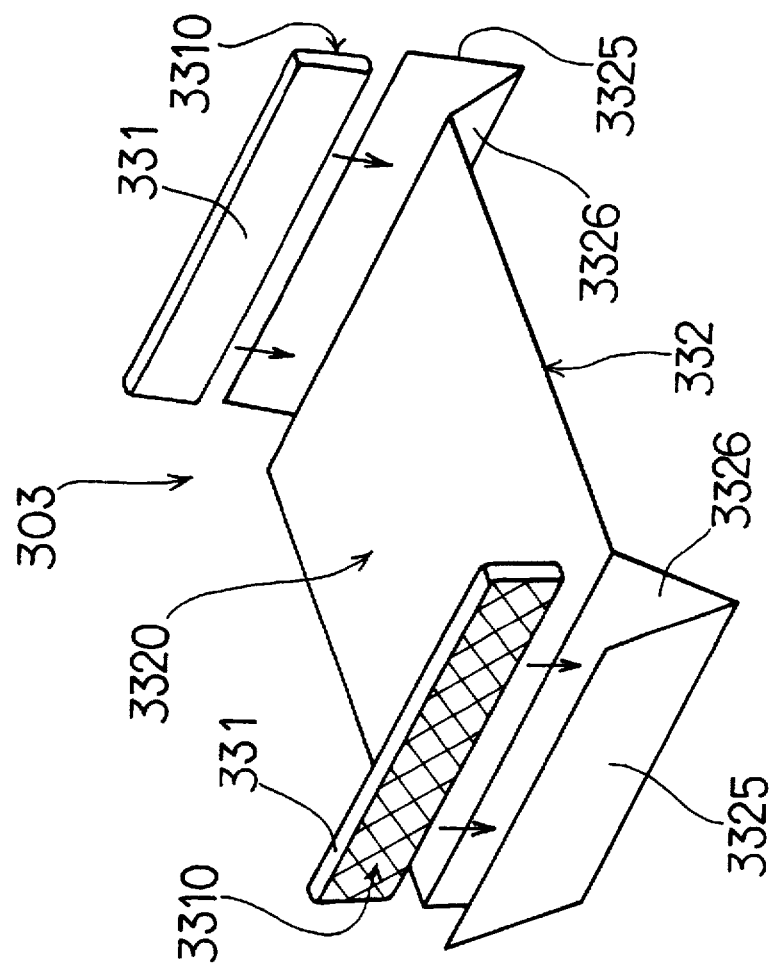
FIG. 24 is an exploded perspective view illustrating the filter element of a tenth embodiment.

As shown in FIG. 24, the filter element 303 has different shape from the ninth embodiment. That is, the filter element 303 has a flat portion 3320 and forms an end piece 3325 by bending the end of the seat shape filter material 332 and installed through the cushion material 331 between the end piece 3325 and adjacent piece 3326. At a portion other than the end piece 3325 and the adjacent piece 3326, the seat shape of the filter material 332 remains in a flat plate shape. It is better to form a corrugated filter material to increase the filtration area of the filter.

The cushion material 331 is a polyurethane foam with adhesive tape cut with a designated length. The adhesive tape is provided at the side surface 3310. Since the polyurethane foam is on the market, the manufacturing cost can be reduced. Also, since an application process of the adhesive is not necessary, the amount of manufacturing processing can be reduced.

The filter and its manufacturing method in a eleventh embodiment are explained according to FIGS. 25 through 31.

Figure 25:
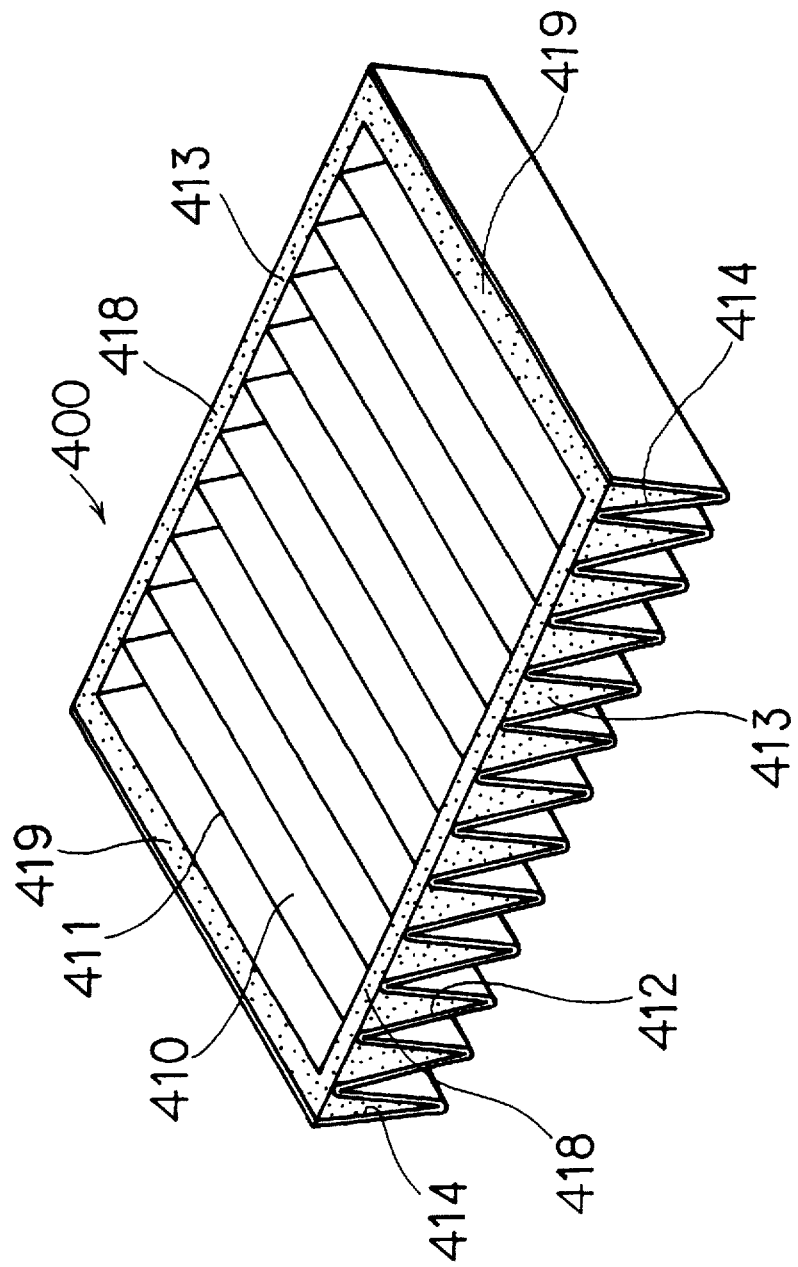
FIG. 25 is a perspective view illustrating the filter of an eleventh embodiment.

As shown in FIG. 25, in the wave-shaped filter material 410 installed alternately, the convex crease portion 411 and the concave crease portion 412 in which a flat plate filter material is folded in the filter 400, an elastic filler 418 is filled at both side portions 413 of the wave-shaped filter material 410 with a belt shape along a direction crossing a wave direction in an inner portion of the concave portion 412. As an elastic filler, foam type hot-melt, hot-melt resin urethane, rubber, or other kinds of various foaming body are used.

An elastic filler 419 is filled along the concave crease portion as a last end portion 414 in the folded direction of the wave-shaped filter material 410. The elastic fillers 418 and 419 are adhered with the wave-shaped filter material 410. Therefore, the wave-shaped filter material 410 of both side portions 413 of the concave crease portion is connected through the elastic fillers 418 and 419.

In both side portions 413 of the wave-shaped filter material 410, the elastic filler 418 is projected outward the wave-shaped filter material 410. The elastic filler 418 is connected to the elastic filler 419 at the last end portion 414 at four corners of the wave-shaped filter material 410.

The filler width of the elastic fillers 418 and 419 is 1 cm and is formed of foam-shaped hot melt. The wave-shaped filter material 410 is made of non-woven fabric cloth of which material is polyester or the like.

Figure 26:
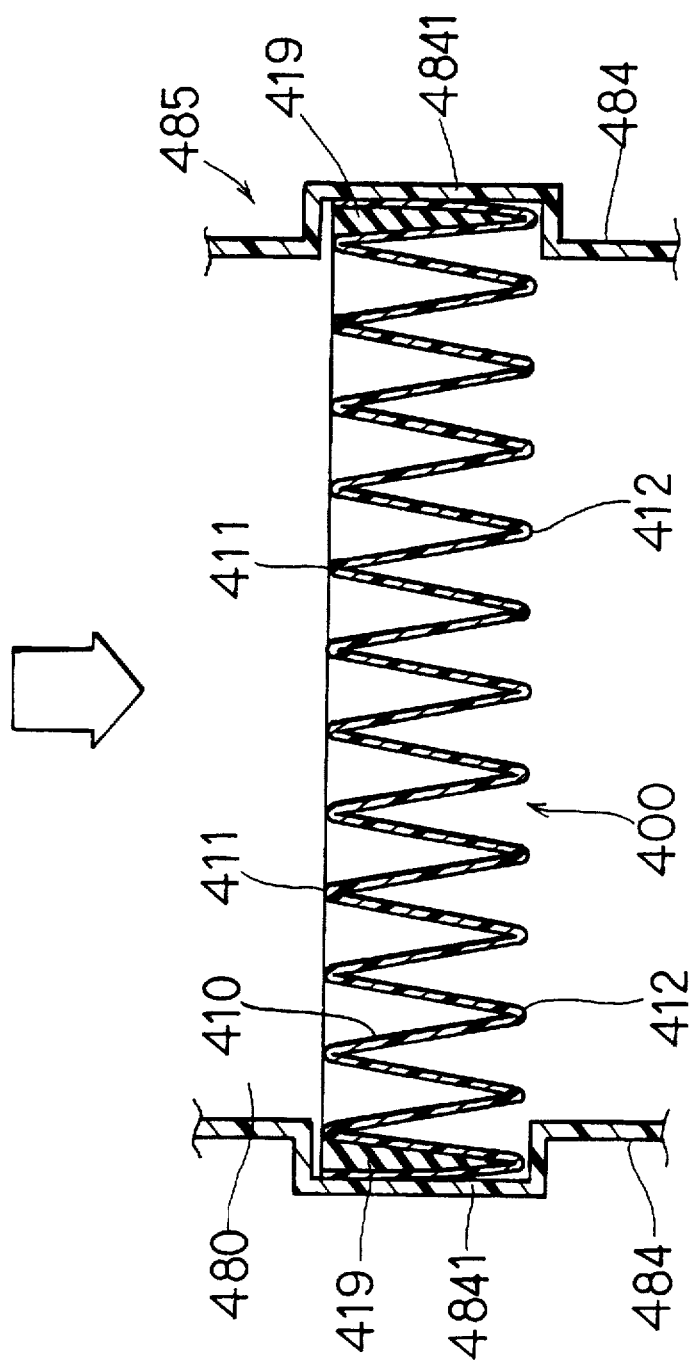
FIG. 26 is a cross-sectional view illustrating an engagement portion of the filter of the eleventh embodiment.

As shown in FIG. 26, the filter device 485 includes the case 484 through which the filtered air passes and the filter 400 installed inside the case 484. The filter 400 is engaged with the engagement portion 4841 formed in the three directions in the inner wall of the case 484.

Figure 27:
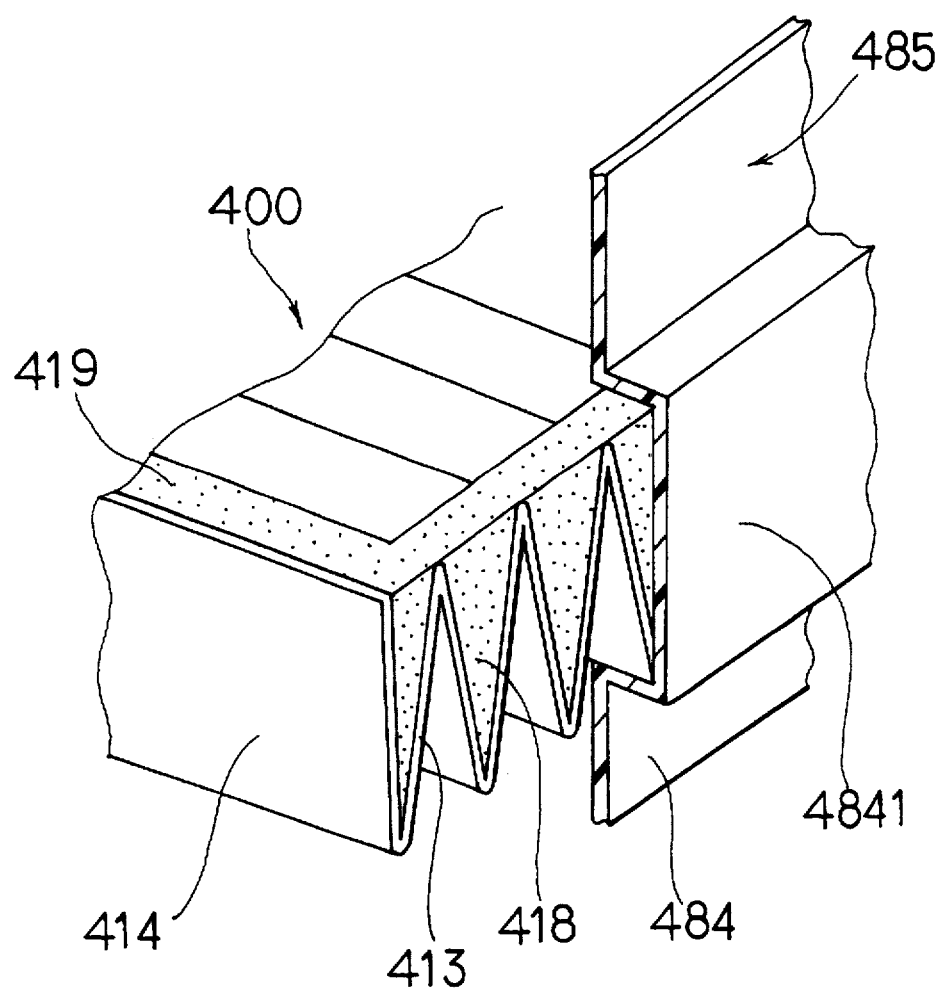
FIG. 27 is an explanatory view illustrating the engagement portion of the filter in the eleventh embodiment.

As shown in FIG. 27, at the filter 400 in the filter device 485, the elastic filler 418 at both side portions 413 of the wave-shaped filter material 410 contacts the engagement portion 4841. Clearance does not exist between the engagement portion 4841 and the elastic filler 418.

Figure 28:
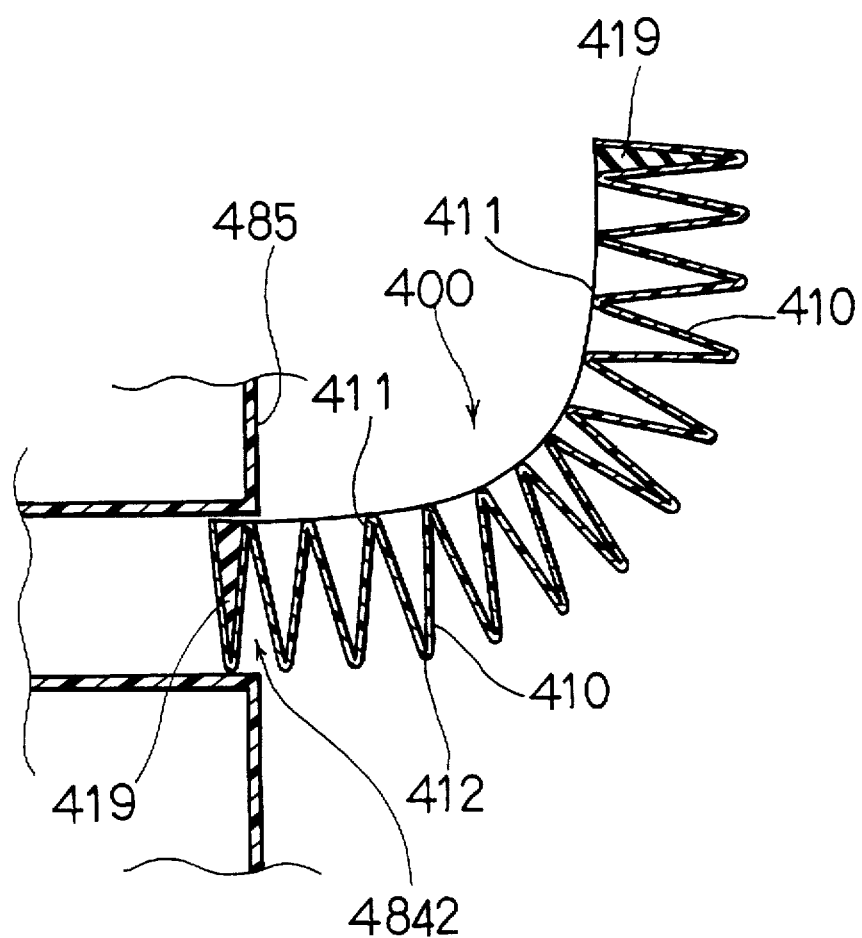
FIG. 28 is an explanatory view illustrating an installing method of the filter to the air-conditioner of the eleventh embodiment.

As shown in FIGS. 27 and 28, in a window 4842 formed at a portion of the engagement portion 4841, the filter 400 can be replaced by opening a detachable window not shown in the figure. In a case of exchanging the filter 400, as shown in FIG. 28, the filter can be replaced by being bent largely.

Figure 29:
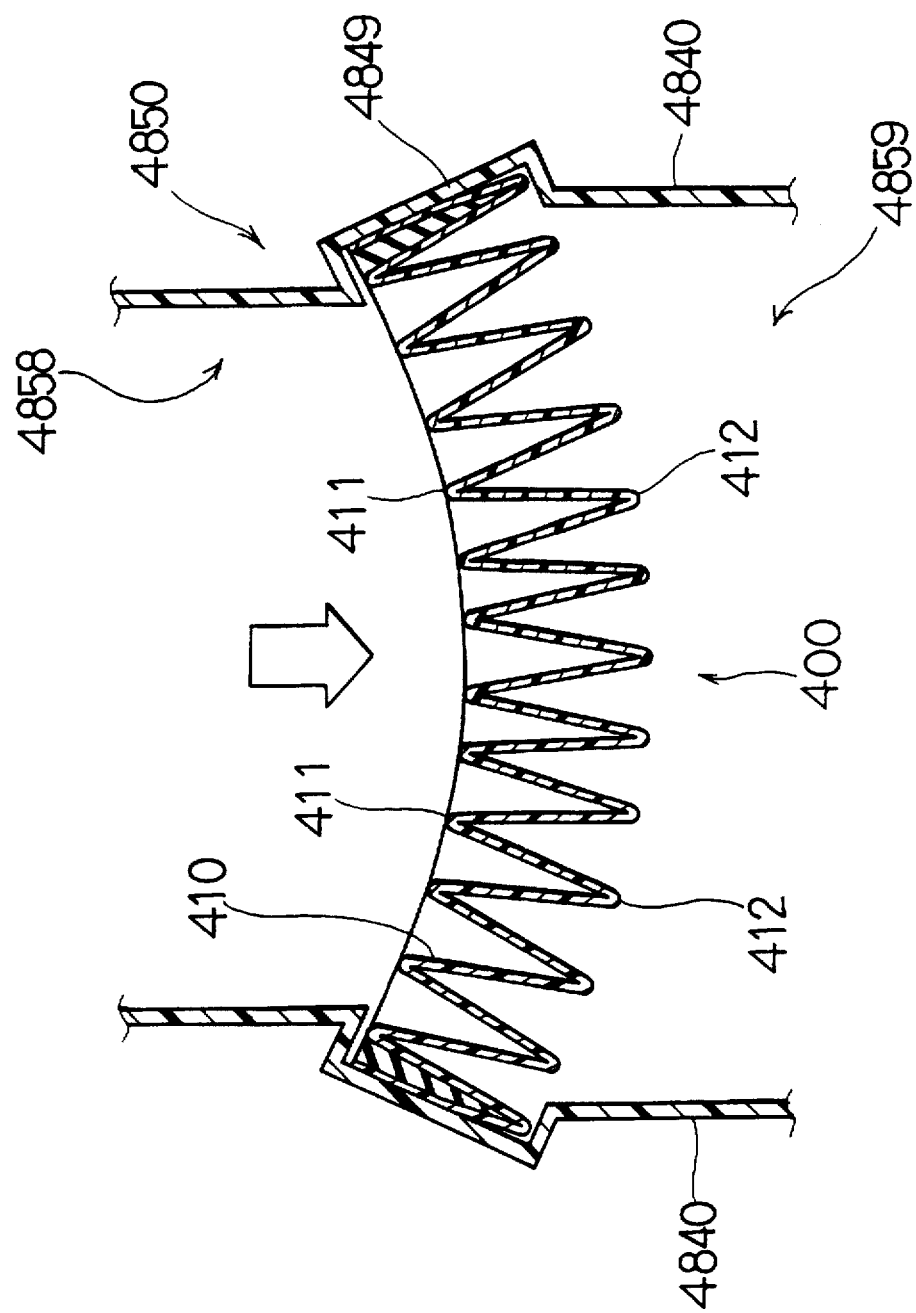
FIG. 29 is an explanatory view illustrating an installed condition of the filter in the air-conditioner of the eleventh embodiment.

In FIG. 29, in the filter device 4850, an upstream side 4858 in which the filtered air flows is small and a down stream side 4859 is large. In this case, the groove-shaped engagement portion 4849 is installed by bending with the case 4840 of the filter device 4850 and the filter 400 is engaged with bending largely.

Figure 30:
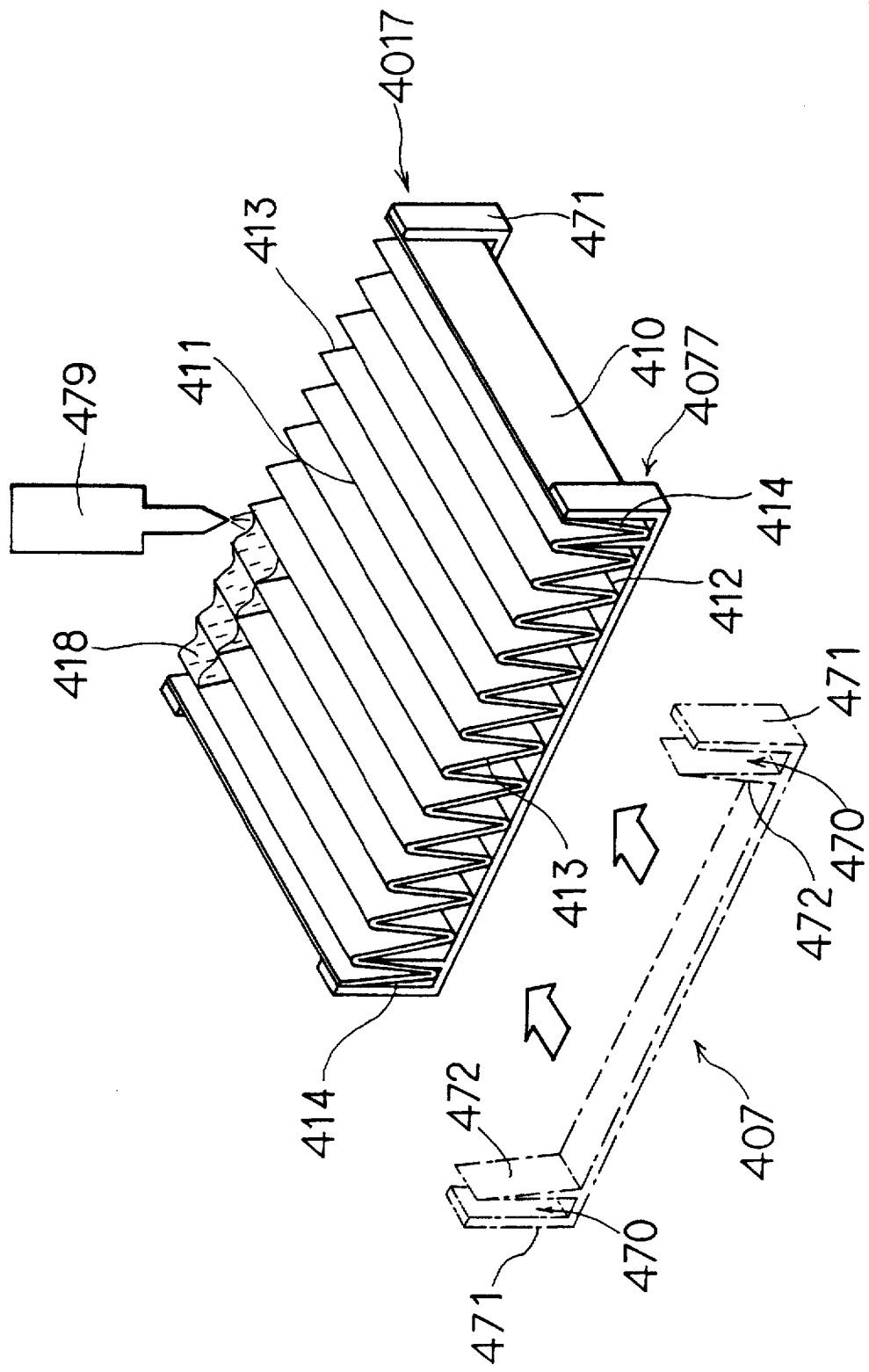
FIG. 30 is an explanatory view illustrating filling an elastic filler to the wave-shaped filter material of the eleventh embodiment.

Next, the manufacturing method of the filter is explained according to FIG. 30.

The roll-shaped flat plate filter material is folded and the wave-shaped filter material 410 in which the convex crease portion 411 and the concave crease portion 412 are installed alternately is obtained. The wave-shaped filter material 410 is cut with the designated length. The last end portion 414 of the wave-shaped filter material 410 is cut to be the concave crease portion.

Further, at both side portions of the wave-shaped filter material 410, a jig 407 having a filter material support member 472 is inserted. The jig 407 includes a frame body 471 holding the wave-shaped filter material 410 and the support member 472 installed a periphery of the frame body 471. At the holding portion 470 formed by the frame body 471 and the support member 472, the concave crease portion, as the last end portion of the wave-shaped filter material 410, is held. The jig 407 is disposed against both side portions 413 of the wave-shaped filter material 410.

Next, inside the concave crease portion 412 of the wave-shaped filter material 410, the elastic filler 418 is filled with a belt shape along the direction crossing the wave direction. Filled portions of the elastic filler 418 are both side portions 413 of the wave-shaped filter material 410 the and filled width of the elastic filler 418 is 1 cm.

Finally, at the concave crease portion as the last end portions 414 of the wave-shaped filter material 410, the elastic filler 419 is filled. A filler apparatus 479 is to fill the elastic fillers 418 and 419.

Next, the operation and the effects in the embodiment is explained.

In the filter in this embodiment, at each portion of the wave-shaped filter material, the elastic filler is filled. Therefore, by giving enough flexibility for the exchanging operation of the filter, the outer shape of the wave-shaped filter material can be preserved.

When the filter in the present invention is installed at the air-conditioner or the like directly, even though a space for replacing the filter is small, the filter can be installed at the air-conditioner or the like easily. In the engagement portion 4841 of the filter device, the engagement portion 4841 and an exposure portion of the elastic filler 418 in the filter contact each other (see FIG. 27). Thus, the seal ability at the engagement portion 4841 is increased.

According to the manufacturing method in the embodiment, the filter 400 can be manufactured easily and the manufacturing process is decreased by comparing it to the filter in which a rigid outer frame is adhered to the wave-shaped filter material. Therefore, the manufacturing cost is cheap.

Thus, the filter and the manufacturing method, in which the outer shape thereof can be preserved and the manufacturing cost is cheap and the installation is easy, can be provided.

Figure 31:
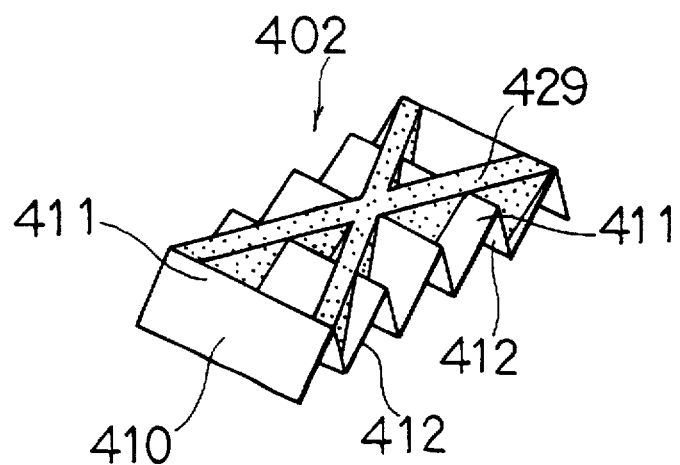
FIG. 31 is a perspective view illustrating the filter of a twelfth embodiment.
Figure 32:
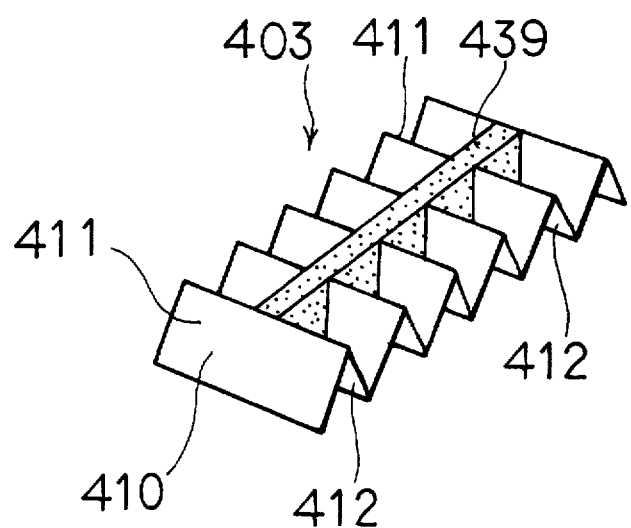
FIG. 32 is a perspective view illustrating the filter in the twelfth embodiment.

The twelfth embodiment is shown in FIGS. 31 and 32. The other filler in this embodiment of the elastic filler is explained.

As shown in FIG. 31, in the filter 402, the elastic filler 429 is filled in an X belt shape in the center of the wave-shaped filter material 410 by contacting the convex crease portions at the top. As shown in FIG. 32, in the filter 403, an elastic filler 439 is filled in a belt shape in the top center of the wave-shaped filter material in the longitudinal direction. The filters 402 and 403 are not filled with the elastic fillers at the last end portions 414 of the wave-shaped filter material 410.

The other parts are the same as in the eleventh embodiment. The same operation and effects as in the eleventh embodiment are obtained.

Figure 33:
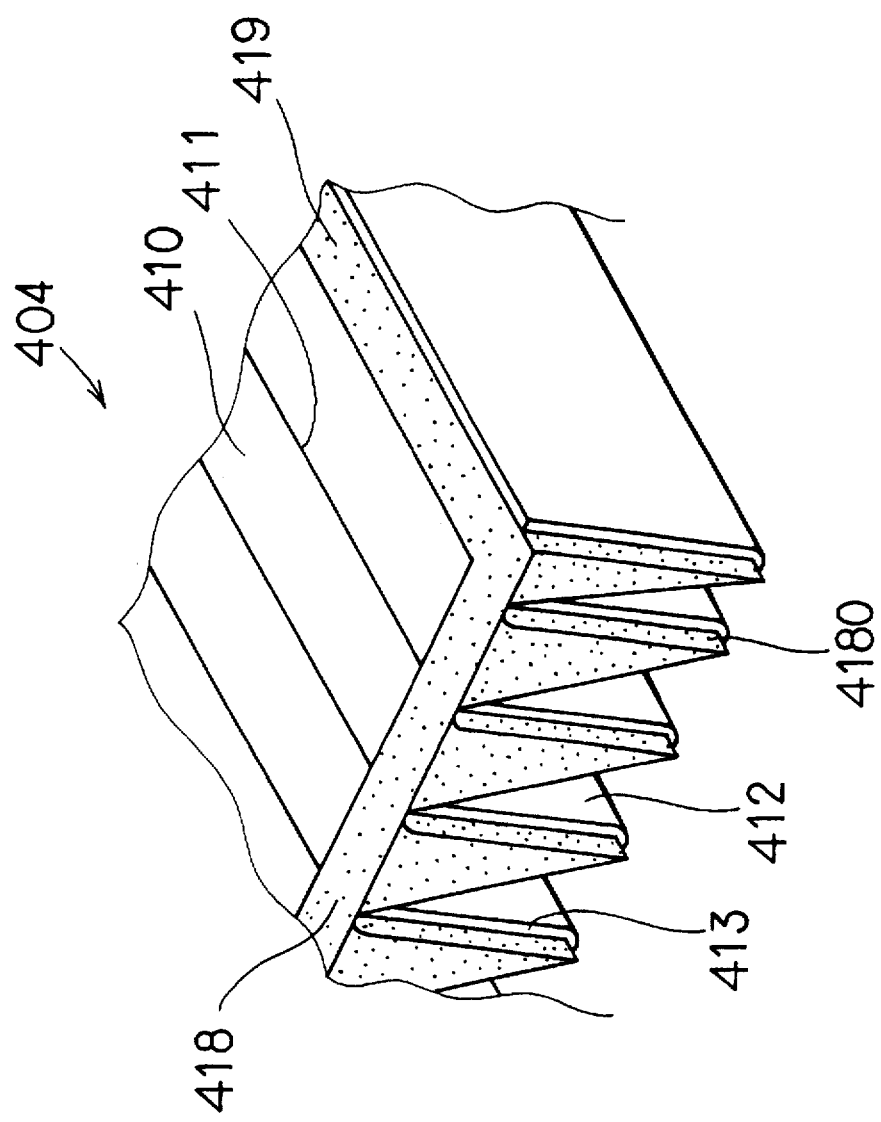
FIG. 33 is a partial perspective view illustrating the filter of a thirteenth embodiment.

The thirteenth embodiment is shown in FIG. 33. In the filter 404, the elastic filler 418 is filled at both side portions 413 of the wave-shaped filter material 410 and a projected portion 4180 is provided at the elastic filler 418. That is, as shown in FIG. 33, at a side portion of the wave-shaped filter material 410, the elastic filler 418 has the projected portion 4180 with the same material. The projected portion 4180 is a portion in which the elastic filler 418 projects outwardly with several millimeters from both side portions 413 of the wave-shaped filter material 410. In order to make the projected portion 4180, the same manufacturing method is used, except using a greater amount of the elastic filler 418. The other parts are the same as in the eleventh embodiment.

In order to install the filter 404 to the air-conditioner, a portion between the filter 404 and the engagement portion 4841 is attached elastically by the project portion 4180. Thus, the sealing ability between the filter 404 and the engagement portion 4841 is increased more. The operational effect in this embodiment is the same as the eleventh embodiment.

Figure 34:
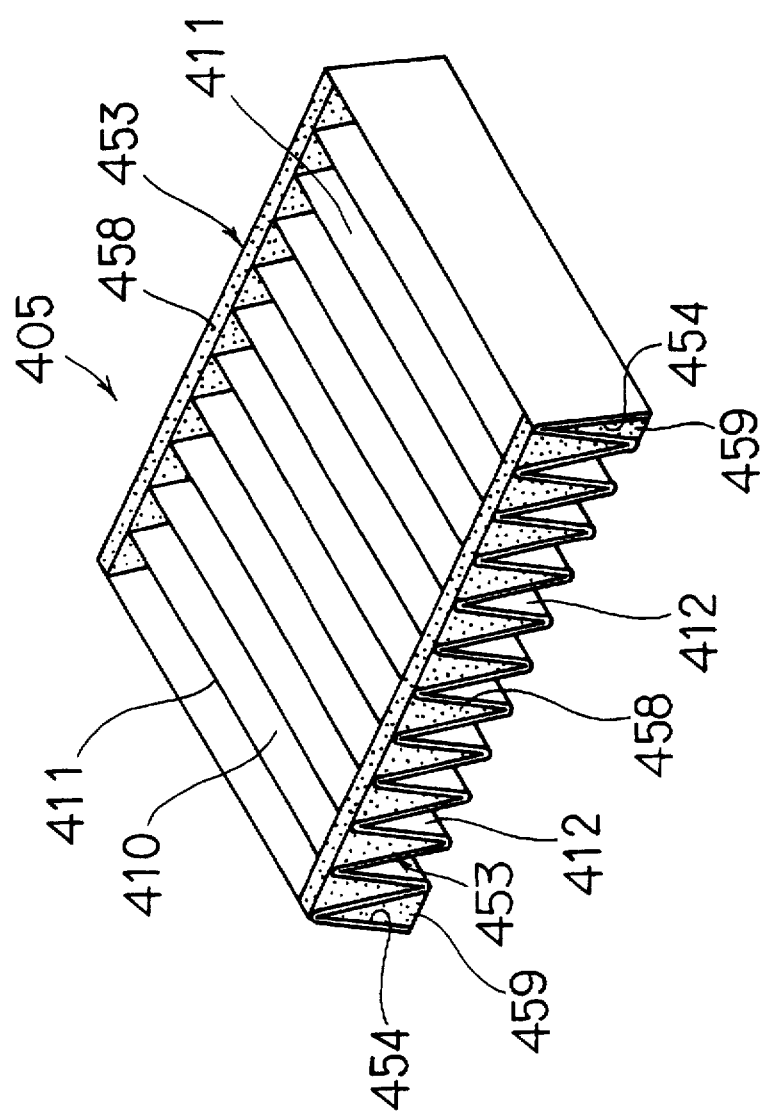
FIG. 34 is a perspective view illustrating the filter of a fourteenth embodiment.
Figure 35:
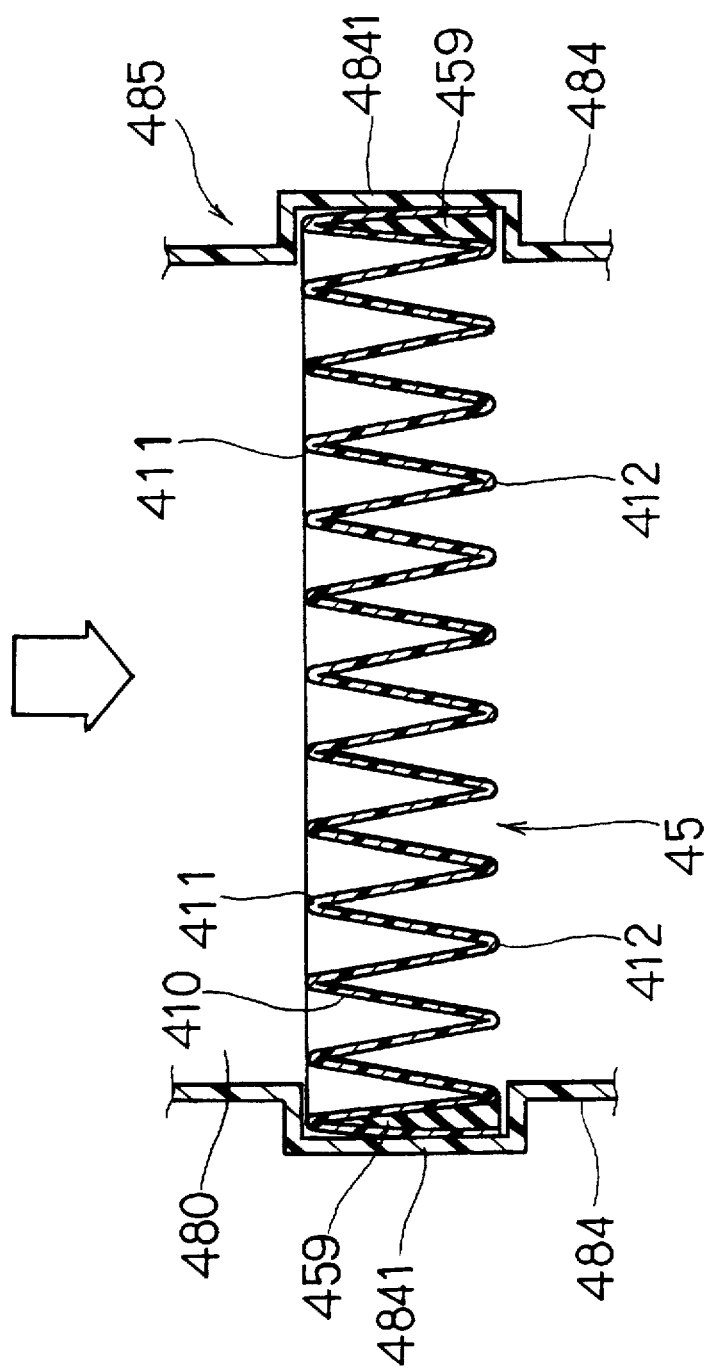
FIG. 35 is an explanatory view illustrating the installed condition of the filter in the air-conditioner of the fourteenth embodiment.

The fourteenth embodiment is shown in FIGS. 34 and 35. In the filter 405, the last end portion 454 of the wave-shaped filter material 410 is the convex crease portion 411 and an elastic filler 459 is filled.

That is, as shown in FIG. 34, in the filter 405, at the wave-shaped filter material 410 installed, the convex crease portion 411 and the concave crease portion 412, alternately by folding a flat plate filter material, the elastic filler 458 is filled at the both side portions 453 of the wave-shaped filter material 410 with a belt shape along a direction crossing the wave direction in the inside portion of the concave portion 412. The elastic filler 459 is filled at the convex portion as the last end portion 454 in the folding direction of the wave-shaped filter material 410.

As shown in FIG. 35, when the filter 405 is installed at the air-conditioner 408, the filter 405 is engaged at the engagement portion 4841 of the case 484 inside the filter device 485. The other parts are the same as in the eleventh embodiment. The operation and effects are the same as the eleventh embodiment.

Figure 36:
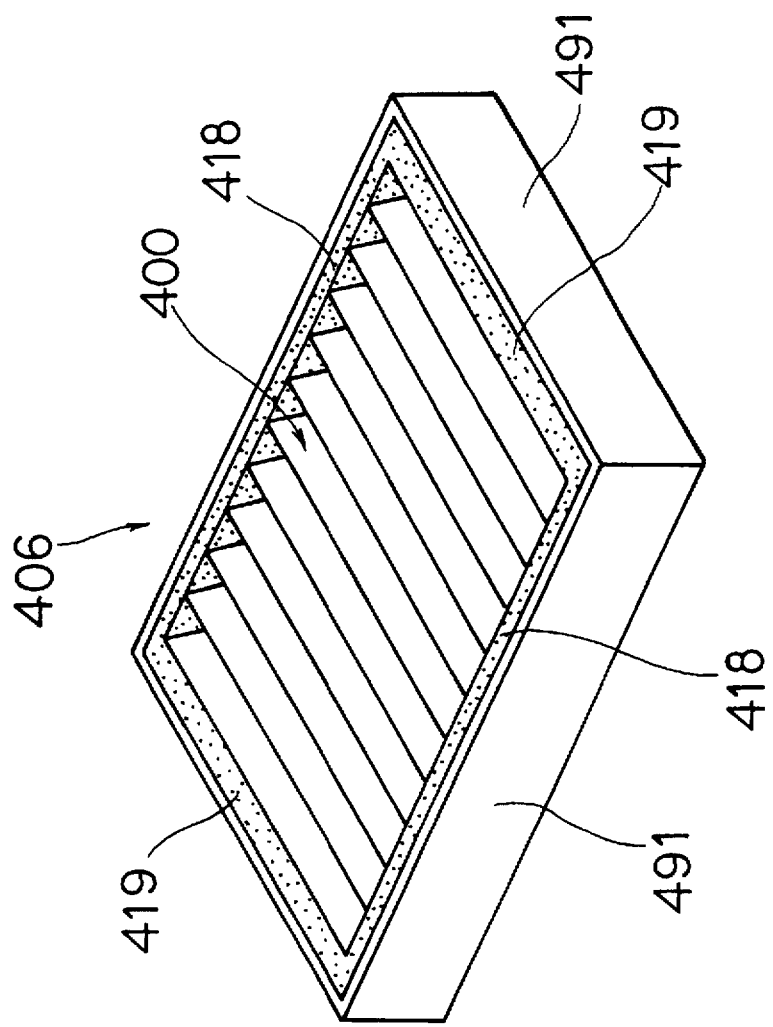
FIG. 36 is a perspective view illustrating the filter device of fifteenth embodiment.

The fifteenth embodiment is shown in FIG. 36. The filter in the eleventh embodiment is fixed to a rigid outer frame 491 prepared beforehand so that a filter device 406 is made.

That is, the rigid outer frame 491 having rigidity with a smaller inner diameter than the filter 400 is manufactured with resin or the like. The filter 400 is assembled inside the rigid outer frame 491.

According to this embodiment, the filter device having a high rigidity can be obtained. That is, the filter 400 in the present invention has enough strength by itself. However, in the case that high rigidity is required such as when flowing pressure of the filtered fluid is especially high or the like, as described in the embodiments, the filter 400 is reinforced by the rigid outer frame 491 so that the filter device 406 is made.

In the above, as for the filter material, such as electric paper, activated carbon fiber paper, non-woven fabric ,etc. are utilized. As for an adhesive, such as hot-melt resin , rubber, urethane, etc. are utilized.

A filter in the present invention may be utilized for an air filter for air conditioners or an engine intake system, or gas filter for gas filtration and a filter for liquid filtration for water or liquid of every kind.

What is claimed is:

1. A filter comprising:
   a filter material corrugated in a wave plate shape along a first axis thereof,
   wherein said filter material has an end filter material piece positioned at an end of said first axis and an adjacent end filter material piece adjoined to said end filter material piece, said end filter material piece and said adjacent end filter material piece are adhered to each other,
   wherein said filter material is folded outward to said adjacent end filter material piece in such a manner that said end filter material piece and said adjacent end filter material piece form a smaller convex crease portion than adjacent filter materials form.

2. A filter comprising:
   a filter material corrugated in a wave plate shape along a first axis thereof,
   wherein said filter material has an end filter material piece positioned at an end of said first axis and an adjacent end filter material piece adjoined to said end filter material piece, said end filter material piece and said adjacent end filter material piece are adhered to each other, and
   wherein said end filter material piece is folded inward to said adjacent end filter material piece in such a manner that said end filter material piece curls toward said adjacent end filter material piece and an adjacent filter material.

3. A filter according to claim 1, wherein
   said filter material has side frame bodies extending along said first axis of said filter material at both side ends of a second axis which is perpendicular each other of said filter material, said side frame bodies having a plate shape.

4. A filter according to claim 1, further comprising a hot-melt adhesive adhering said end filter material piece and said adjacent material piece.

5. A filter according to claim 1, further comprising
   an elastic material disposed between said adjacent end filter material pieces.

6. A filter according to claim 5, further comprising:
   a frame body for accommodating said filter material and having a holding space for holding said end filter material piece, said adjacent end filter material piece and said elastic material therein.

7. A filter according to claim 6, wherein said holding space is formed between a support member protruding in parallel to an inner wall of said frame body so that said support member is inserted into a convex crease portion of said filter material.

8. A filter according to claim 7, wherein a width of said holding space is smaller than a total width of said elastic member, a thickness of said end filter member piece and a thickness of said adjacent filter material.

9. A filter according to claim 5, wherein said elastic material extends from said peripheral portion away from said filter material along said second axis.

10. A filter according to claim 2, wherein
    said filter material has side frame bodies extending along said first axis of said filter material at both side ends of a second axis which is perpendicular each other of said filter material, said side frame bodies having a plate shape.

11. A filter according to claim 2, further comprising a hot-melt adhesive adhering said end filter material piece and said adjacent material piece.

12. A filter according to claim 2, further comprising:
    an elastic material disposed between said adjacent end filter material pieces.

13. A filter according to claim 12, further comprising:
    a frame body for accommodating said filter material and having a holding space for holding said end filter material piece, said adjacent end filter material piece and said elastic material therein.

14. A filter according to claim 13, wherein said holding space is formed between a support member protruding in parallel to an inner wall of said frame body so that said support member is inserted into a convex crease portion of said filter material.

15. A filter according to claim 14, wherein a width of said holding space is smaller than a total width of said elastic member, a thickness of said end filter member piece and a thickness of said adjacent filter material.

16. A filter according to claim 12, wherein said elastic material extends from said peripheral portion away from said filter material along said second axis.

* * * * *